(12) United States Patent
Eash et al.

(10) Patent No.: US 11,480,784 B2
(45) Date of Patent: *Oct. 25, 2022

(54) BINOCULAR DISPLAY WITH DIGITAL LIGHT PATH LENGTH MODULATION

(71) Applicant: Avegant Corp., San Mateo, CA (US)

(72) Inventors: Aaron Matthew Eash, San Francisco, CA (US); Allan Thomas Evans, San Francisco, CA (US); Andrew John Gross, Redwood City, CA (US); D. Scott Dewald, Dallas, TX (US); Eamon Han O'Connor, Emeryville, CA (US); Forrest Foust, Sunnyvale, CA (US); Warren Cornelius Welch, III, Foster City, CA (US)

(73) Assignee: Avegant Corp., San Mateo, GA (US)

( * ) Notice: Subject to any disclaimer, the term of this patent is extended or adjusted under 35 U.S.C. 154(b) by 373 days.

This patent is subject to a terminal disclaimer.

(21) Appl. No.: 16/726,224

(22) Filed: Dec. 23, 2019

(65) Prior Publication Data

US 2020/0137377 A1    Apr. 30, 2020

Related U.S. Application Data

(63) Continuation of application No. 15/377,938, filed on Dec. 13, 2016, now Pat. No. 10,516,879, which is a (Continued)

(51) Int. Cl.
*G02B 26/08* (2006.01)
*G02F 1/29* (2006.01)
(Continued)

(52) U.S. Cl.
CPC .......... *G02B 26/08* (2013.01); *H04N 13/122* (2018.05); *H04N 13/128* (2018.05);
(Continued)

(58) Field of Classification Search
CPC .. H04N 13/344; H04N 13/337; H04N 13/128; H04N 13/383; H04N 13/339;
(Continued)

(56) References Cited

U.S. PATENT DOCUMENTS 3,586,416 A    6/1971  Bitetto
3,856,407 A    12/1974 Takeda et al.
(Continued)

FOREIGN PATENT DOCUMENTS

CN    1910499 A    2/2007
CN    102566049 A   7/2012
(Continued)

OTHER PUBLICATIONS

Hui, Wang, "Optical Science and Applications Series: Digital holographic three-dimensional display and detection", Shanghai Jiaotong University Press, Nov. 1, 2013, 4 pages.
(Continued)

*Primary Examiner* — William R Alexander
*Assistant Examiner* — Tamara Y. Washington
(74) *Attorney, Agent, or Firm* — Nicholson De Vos Webster & Elliott LLP; Judith Szepesi

(57) ABSTRACT

A near-eye display system comprising a image source, a modulation stack, and an imaging assembly. The modulation stack, in one embodiment, comprises one or more digital light path length modulators.

20 Claims, 20 Drawing Sheets

US 11,480,784 B2
Page 2

Related U.S. Application Data continuation-in-part of application No. 15/358,040, filed on Nov. 21, 2016, now Pat. No. 10,401,639, and a continuation-in-part of application No. 15/335,298, filed on Oct. 26, 2016, now Pat. No. 10,187,634, said application No. 15/358,040 is a continuation-in-part of application No. 15/236,101, filed on Aug. 12, 2016, now Pat. No. 10,809,546, said application No. 15/335,298 is a continuation of application No. 15/236,101, filed on Aug. 12, 2016, now Pat. No. 10,809,546.

(51) Int. Cl.
  *H04N 13/122* (2018.01)
  *H04N 13/128* (2018.01)
  *H04N 13/337* (2018.01)
  *H04N 13/383* (2018.01)
  *H04N 13/339* (2018.01)
  *H04N 13/344* (2018.01)

(52) U.S. Cl.
  CPC ......... *H04N 13/337* (2018.05); *H04N 13/339* (2018.05); *H04N 13/383* (2018.05); *G02F 1/29* (2013.01); *H04N 13/344* (2018.05)

(58) Field of Classification Search
  CPC .... H04N 13/122; H04N 9/3105; H04N 9/315; G03B 35/18; G03B 35/26; G03B 21/2073; G02F 1/01; G02F 1/13363; G02B 27/017; G02B 26/001; G02B 26/0841; G02B 26/02; G02C 7/101; G02C 26/02; G09G 3/3466; G09G 3/2074
  See application file for complete search history.

(56) References Cited

U.S. PATENT DOCUMENTS

| | | | |
|---|---|---|---|
| 4,253,723 A | 3/1981 | Kojima et al. |
| 4,670,744 A | 6/1987 | Buzak |
| 5,610,765 A | 3/1997 | Colucci |
| 5,751,243 A | 5/1998 | Turpin |
| 6,134,031 A | 10/2000 | Nishi et al. |
| 6,515,801 B1 | 2/2003 | Shimizu |
| 6,580,078 B1 | 6/2003 | O'callaghan et al. |
| 7,023,548 B2 | 4/2006 | Pallingen |
| 7,360,899 B2 | 4/2008 | Mcguire, Jr. et al. |
| 7,798,648 B2 | 9/2010 | Ijzerman et al. |
| 7,905,600 B2 | 3/2011 | Facius et al. |
| 8,262,234 B2 | 9/2012 | Watanabe |
| 8,755,113 B2 | 6/2014 | Gardner et al. |
| 9,025,067 B2 | 5/2015 | Gray et al. |
| 9,304,319 B2 | 4/2016 | Bar-Zeev et al. |
| 9,494,805 B2 | 11/2016 | Ward et al. |
| 9,588,270 B2 | 3/2017 | Merrill et al. |
| 10,057,488 B2 | 8/2018 | Evans et al. |
| 10,185,153 B2 | 1/2019 | Eash et al. |
| 10,187,634 B2 | 1/2019 | Eash et al. |
| 10,379,388 B2 | 8/2019 | Eash et al. |
| 10,401,639 B2 | 9/2019 | Evans et al. |
| 2001/0027125 A1 | 10/2001 | Kiyomatsu et al. |
| 2002/0191300 A1 | 12/2002 | Neil |
| 2003/0020925 A1 | 1/2003 | Patel et al. |
| 2004/0156134 A1 | 8/2004 | Furuki et al. |
| 2004/0263806 A1 | 12/2004 | Silverstein et al. |
| 2005/0141076 A1 | 6/2005 | Bausenwein et al. |
| 2006/0119951 A1 | 6/2006 | McGuire |
| 2007/0030456 A1 | 2/2007 | Duncan et al. |
| 2007/0030543 A1 | 2/2007 | Javidi et al. |
| 2007/0139760 A1 | 6/2007 | Baker et al. |
| 2007/0146638 A1 | 6/2007 | Ma et al. |
| 2008/0130887 A1 | 6/2008 | Harvey et al. |
| 2008/0174741 A1 | 7/2008 | Yanagisawa et al. |
| 2008/0205244 A1 | 8/2008 | Kitabayashi |
| 2009/0021824 A1 | 1/2009 | Ijzerman et al. |
| 2009/0046262 A1 | 2/2009 | Okazaki et al. |
| 2009/0052838 A1 | 2/2009 | McDowall et al. |
| 2009/0061505 A1 | 3/2009 | Hong et al. |
| 2009/0061526 A1 | 3/2009 | Hong et al. |
| 2009/0237785 A1 | 9/2009 | Bloom |
| 2009/0244355 A1 | 10/2009 | Horie |
| 2011/0032436 A1 | 2/2011 | Shimizu et al. |
| 2011/0075257 A1 | 3/2011 | Hua et al. |
| 2011/0149245 A1 | 6/2011 | Barth et al. |
| 2012/0075588 A1 | 3/2012 | Suga |
| 2012/0113092 A1 | 5/2012 | Bar-Zeev et al. |
| 2013/0070338 A1 | 3/2013 | Gupta et al. |
| 2013/0100376 A1 | 4/2013 | Sawado |
| 2013/0222770 A1 | 8/2013 | Tomiyama |
| 2013/0344445 A1 | 12/2013 | Clube et al. |
| 2014/0168035 A1 | 6/2014 | Luebke et al. |
| 2014/0176818 A1 | 6/2014 | Watson et al. |
| 2015/0061976 A1 | 3/2015 | Ferri |
| 2015/0153572 A1 | 6/2015 | Miao et al. |
| 2015/0205126 A1 | 7/2015 | Schowengerdt |
| 2015/0319342 A1 | 11/2015 | Schowengerdt |
| 2016/0041390 A1 | 2/2016 | Poon et al. |
| 2016/0041401 A1 | 2/2016 | Suga |
| 2016/0077338 A1 | 3/2016 | Robbins et al. |
| 2016/0131920 A1 | 5/2016 | Cook |
| 2016/0195718 A1 | 7/2016 | Evans |
| 2016/0225337 A1 | 8/2016 | Ek et al. |
| 2016/0227195 A1 | 8/2016 | Venkataraman et al. |
| 2016/0306168 A1 | 10/2016 | Singh et al. |
| 2016/0381352 A1 | 12/2016 | Palmer |
| 2017/0038579 A1 | 2/2017 | Yeoh et al. |
| 2017/0068103 A1 | 3/2017 | Huang et al. |
| 2017/0075126 A1 | 3/2017 | Carls et al. |
| 2017/0097507 A1 | 4/2017 | Yeoh et al. |
| 2017/0146803 A1 | 5/2017 | Kishigami et al. |
| 2017/0160518 A1 | 6/2017 | Lanman et al. |
| 2017/0227770 A1 | 8/2017 | Carollo et al. |
| 2017/0269369 A1 | 9/2017 | Qin |
| 2018/0045973 A1 | 2/2018 | Evans et al. |
| 2018/0045974 A1 | 2/2018 | Eash et al. |
| 2018/0045984 A1 | 2/2018 | Evans et al. |
| 2018/0048814 A1 | 2/2018 | Evans et al. |
| 2018/0149862 A1 | 5/2018 | Kessler et al. |
| 2018/0283969 A1 | 10/2018 | Wang et al. |
| 2019/0007610 A1 | 1/2019 | Evans et al. |
| 2019/0086675 A1 | 3/2019 | Carollo et al. |
| 2019/0155045 A1 | 5/2019 | Eash et al. |
| 2019/0174124 A1 | 6/2019 | Eash et al. |

FOREIGN PATENT DOCUMENTS

| | | |
|---|---|---|
| CN | 103765294 A | 4/2014 |
| CN | 105739093 A | 7/2016 |
| CN | 109997357 A | 7/2019 |
| EP | 0195584 A2 | 9/1986 |
| JP | H06258673 A | 9/1994 |
| JP | 3384149 B2 | 3/2003 |
| WO | 2012104839 A1 | 8/2012 |
| WO | 2012175939 A1 | 12/2012 |
| WO | 2015190157 A1 | 12/2015 |
| WO | 2016087393 A1 | 6/2016 |

OTHER PUBLICATIONS

Jun et al., "Industry Patent Analysis Report (vol. 32)—New Display", ISBN: 7513033447, Intellectual Property Publishing House Co., Ltd, Jun. 2015, 4 pages.

Notice of Allowance, U.S. Appl. No. 16/253,140, dated Feb. 18, 2021, 9 pages.

Notice of Allowance, U.S. Appl. No. 16/538,731, dated Feb. 18, 2021, 10 pages.

Hu, Xinda et al., "High-resolution optical see-through multi-focal-plane head-mounted display using freeform optics," Opt. Express 22, 13896-13903 (2014).

Lee, Yun-Han et al., Switchable Lens for 3D Display, Augmented Reality and Virtual Reality. Society for Information Display (SID),

(56) References Cited

OTHER PUBLICATIONS

International Symposium Digest of Technical Papers, vol. 47, Issue 1, May 25, 2016 (4 page).
Matjasec et al., "All-Optical Thermos-Optical Path Length Modulation based on the Vanadium-Doped Fibers," Optical Society of America, vol. 21, No. 10, May 2013, pp. 1-14.
Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).
PCT Search Report Written Opinion PCT/US2017/046644, dated Oct. 23, 20017, 11 pages.
Polatechno Co., Ltd., LCD Projector Components, http://www.polatechno.co.jp/english/products/projector.html downloaded Jun. 17, 2016 (2 pages).
Sandner et al., "Translatory MEMS Actuators for optical path length modulation in miniaturized Fourier-Transform infrared spectrometers," MEMS MOEMS 7(2), Apr.-Jun. 2008 pp. 1-11.

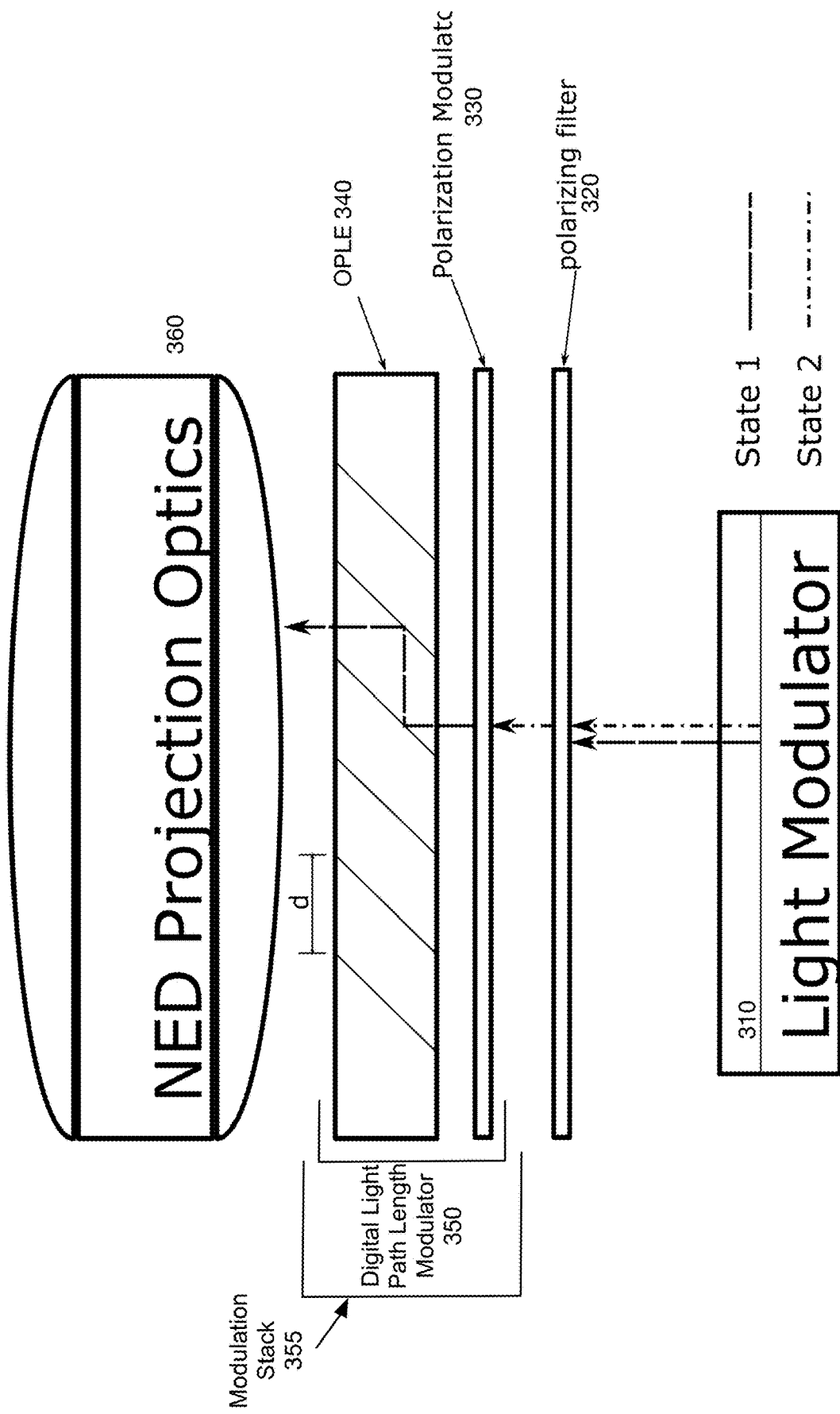

Default, No Correction
Right Eye/Left Eye
10A

Parallax based
Disparity Correction
10B

Parallax Based
Disparity Correction
10C

Luminosity Correction
Right Eye
10D

Amblyopia
Right Eye 10E

Different Perceived
Focal Planes
10F

Differential
Magnification
10G

Color Correction
Right Eye
10H

BINOCULAR DISPLAY WITH DIGITAL LIGHT PATH LENGTH MODULATION

RELATED APPLICATIONS

The present invention is a continuation patent application of U.S. patent application Ser. No. 15/377,938, filed on Dec. 13, 2016, issuing as U.S. Pat. No. 10,516,879, on Dec. 24, 2019, which in turn claims priority to U.S. patent application Ser. No. 15/335,298, filed on Oct. 26, 2016, (Our Ref. 14100P0031) which claims priority to U.S. patent application Ser. No. 15/236,101, filed on Sep. 12, 2016 (14100P0030). The present invention also claims priority to U.S. patent application Ser. No. 15/358,040 filed on Nov. 21, 2016 (14100P0036). All of the above applications are incorporated herein by reference.

FIELD

The present invention relates to a near-eye display system, and more particularly to a binocular near-eye display system including a modulation stack.

BACKGROUND

Near-eye display systems are becoming more common. Such near-eye display systems attempt to provide a three-dimensional display to the user. In the prior art, displays rendering multiple focal planes utilized mechanical movement such as gears or liquid lenses. Such mechanisms are expensive, slow, and relatively fragile. Another prior art method of displaying multiple focal lengths uses multiple mirrors and lenses.

BRIEF DESCRIPTION OF THE FIGURES

FIGS. 3A and 3B are diagrams of one embodiment of a digital light path length modulator in a near eye display (NED) system.

DETAILED DESCRIPTION

A binocular near-eye display system utilizing a modulation stack is described. A modulation stack includes one or more digital light path length modulators, to adjust the path length of light. A digital light path length modulator can be used to create two focal planes. In one embodiment, using a modulation stack with a plurality of digital light path length modulators, the number of focal planes can be increased. Creating a display in which the 3D indicia of parallax, focus, and vergence match provides the capacity to build a system that can meet the physiological requirements of human vision. This produces a better quality 3D display than is currently possible and can prevent the discomfort associated with 3D displays.

The following detailed description of embodiments of the invention makes reference to the accompanying drawings. The drawings show various embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is not to be taken in a limiting sense, and the scope of the present invention is defined only by the appended claims.

Figure 1:
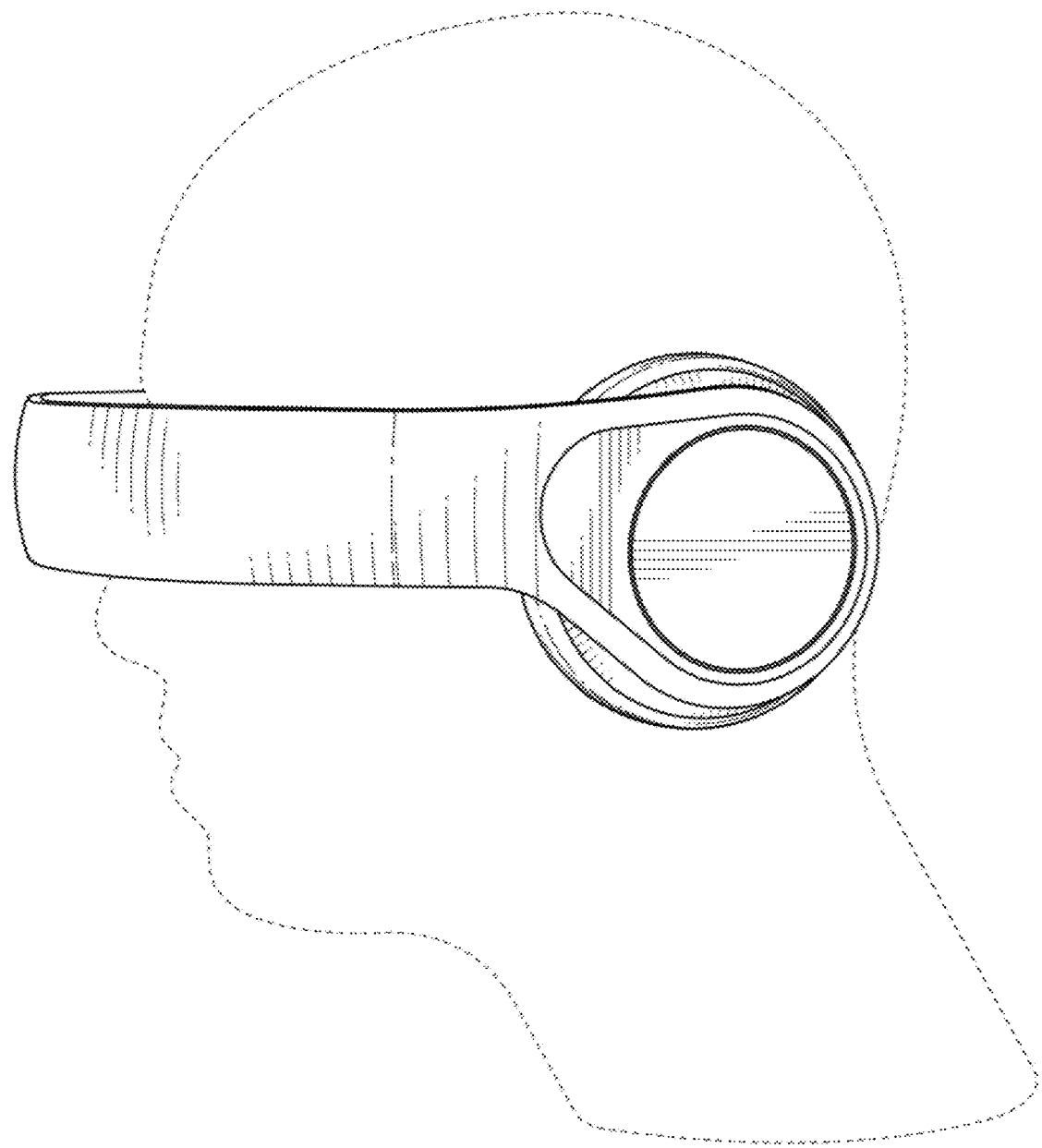
FIG. 1 is an illustration of one embodiment of a near eye display system, in which the present invention may be used.

FIG. 1 is an illustration of one embodiment of a near-eye display system, in which the present invention may be used. The binocular near-eye display system, in one embodiment includes a head-mounted display, which includes a display for both eyes of a user. In one embodiment, the near-eye display system is a display mounted in another device, such as a camera, microscope display, focal assist in a microscope, binoculars, digital scope, medical or surgical display system, endoscope, binocular range finder, etc. In one embodiment, the near-eye display system is coupled with a speaker system to enable the playing of audio-visual output such as movies. The near-eye display system may provide an opaque display, partially transparent display, and/or transparent display. The near-eye display system may provide augmented reality, mixed reality, and/or virtual reality display.

Figure 2A:
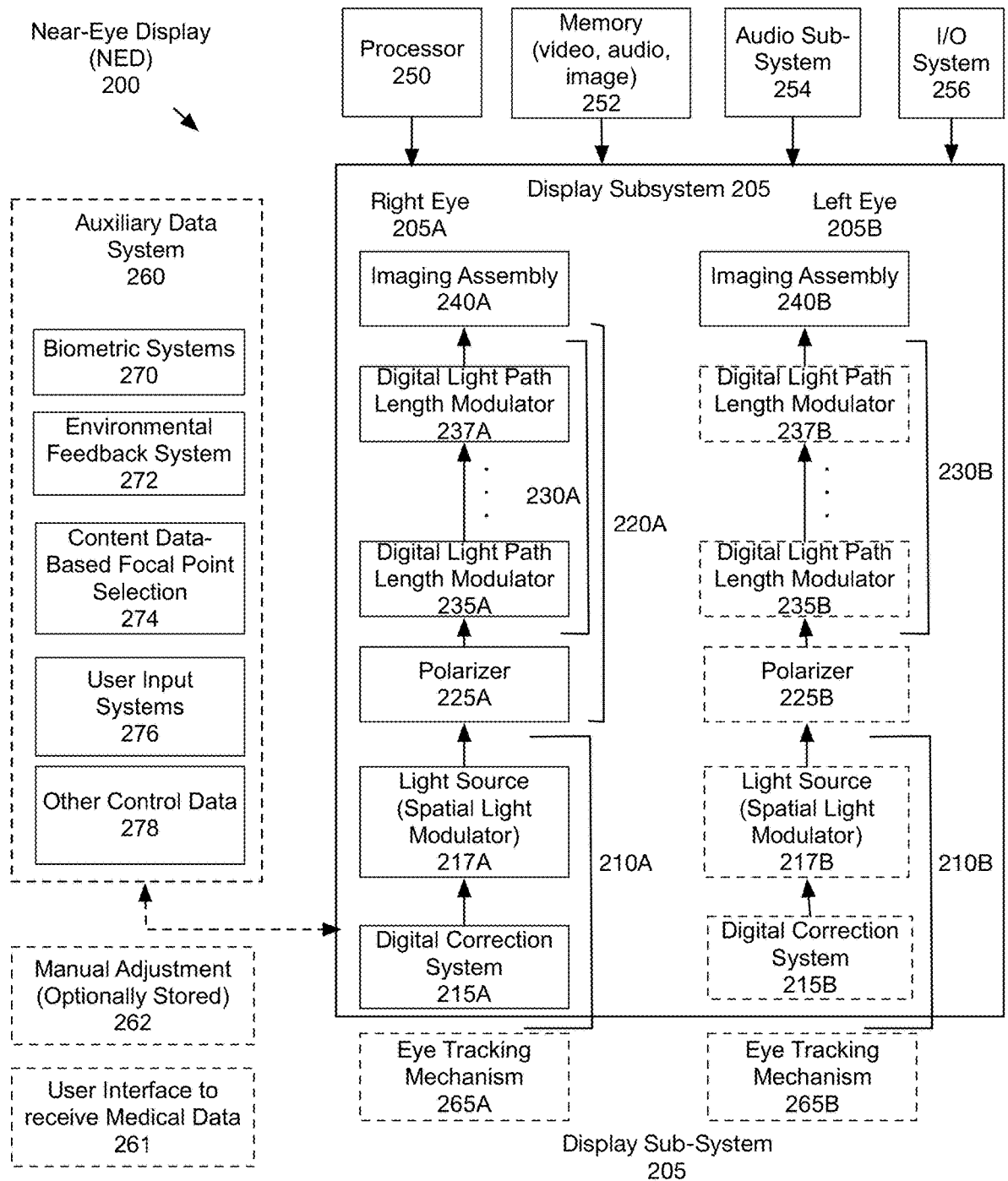
FIG. 2A is a block diagram of one embodiment of a near eye display system.

FIG. 2A is a block diagram of one embodiment of a near-eye display system 200. The near-eye display system 200 includes, in one embodiment, a display subsystem 205, including a right eye 205A and left eye 205B display subsystem, an audio subsystem 254, a processor 250, a memory 252, and optionally an auxiliary data system 260. The display subsystem 205 generates image data. Memory 252 may be a buffer-memory, enabling the near-eye display system 200 to stream content. The memory 252 may also store image and video data for display. I/O system 256 makes image, audio, video, VR, or other content available from other sources (e.g. enables downloading or streaming of content from various sources.)

The display subsystem 205 includes, in one embodiment, a right eye display subsystem 205A. The right eye display subsystem 205A includes an image source 210A, a projection assembly 220A, and an imaging assembly 240A.

The image source 210A in one embodiment includes a light source 217A, which in one embodiment is a spatial light modulator (SLM). The image source 210 in one embodiment also includes a digital correction system 215A, to correct the output of the light source 217A, to account for distortion in the projection assembly 220A. In one embodiment, the light source 217A may be a real image, in which case the light source 217A is external to the system, and there is no digital correction. In one embodiment, the NED 200 may be used for one or more of virtual reality (digital image source), augmented or mixed reality (a combination of real and digital image sources), and reality (real image source.)

The projection assembly 220A includes a polarizer 225A in one embodiment. The polarizer 225A passes through light with a particular polarization. In one embodiment the polarizer may provide pixel-based polarization. Utilizing pixel-based polarization, the system can provide multiple depths to both eyes.

The projection assembly 220A includes a modulation stack 230A. The modulation stack 230A includes one or more digital light path length modulators 235A, 237A. The digital light path length modulators 235A, 237A alter the light path length based on the polarization of the light. In one embodiment, polarizer 225A may be positioned after modulation stack 230A.

Imaging assembly 240A is used to display the image to the user. In one embodiment, the display subsystem 205A may include additional mechanical and optical elements which can provide correction or alteration of the image.

The display sub-system 205 includes a left eye subsystem 205B to provide binocular display. In one embodiment, the left eye subsystem 205B may include only an imaging assembly 240B, while the image source 210A, polarizer 225A, and modulation stack 230A may be shared between the right-eye display subsystem 205A and the left eye display subsystem 205B. In another embodiment, the binocular elements display subsystem 205B may include more of the elements, including one or more of a light source 210B, polarizer 225B, and modulation stack 230B, in addition to the separate imaging assembly 240B. In one embodiment, if the same modulation stack 230A is shared, then the elements appear at the same distance. In one embodiment, by having separate elements, the system can more easily adjust for the user's prescription. In one embodiment, the system provides monocular focal cues for each eye, including adjusting for motion parallax, depth, sizing, occlusion, etc. By adjusting two eyes, utilizing the binocular system, the system further provides binocular focal cues including binocular parallax and convergence.

In one embodiment, the system may include an eye tracking mechanism 265, for one or both eyes 265A, 265B. The eye tracking mechanism 265A/B tracks the gaze vector of the user's eyes. In one embodiment, the system may place image elements in one or more selected locations based on where the user's eyes are looking, using the eye tracking mechanism 265A/B. In one embodiment, the system may select one or more focal planes, based on where the user is looking, as determined based on data from the eye tracking mechanism 265A/B. In one embodiment, the eye tracking mechanism 265A/B is an infrared optical sensor or camera to sense light reflected from the eye. Other techniques may be used for eye tracking. Eye tracking mechanism 265A/B may track one or both eyes.

In one embodiment, the system may receive data from auxiliary data system 260. The auxiliary data system may provide information for selecting the focal lengths and may provide controls. As noted above, the modulation stack 230 can create a perception of an image element at various virtual object distances. The auxiliary data system 260 may be used to select a virtual object distance, based on various factors. The auxiliary data system 260 may also be used by the user/wearer to provide feedback or commands.

In one embodiment, biometric systems 270 may be used to detect the user's state, including the user's identity, emotional state, etc. In one embodiment, the biometric systems 270 may be used to customized and/or control the system.

In one embodiment, the biometric system 270 may be used to detect the user's vision correction, and provide adjustment based on the vision correction. In one embodiment, this may be done by scanning the eye. In one embodiment, the user may be requested to input his or her prescription. In one embodiment, the position of the display subsystem (one or both) may be adjusted based on the user's inter-pupillary distance (IPD). In one embodiment, there may be user interface to receive medical data 261. In one embodiment, the prescription and IPD may be entered through manual adjustment 262. In one embodiment, the system may optionally store these settings, so that if multiple users share the near-eye display system 200, the system may be able to auto-adjust to the prior settings. In one embodiment, the adjustment may be based on the data from biometric systems 270 and/or eye tracking mechanism 265A/B.

Environmental feedback system 272 utilizes sensors to obtain data from the external environment. For example, the environmental feedback system 272 may identify the position of a wall, or window, or other targeted location or object, so data displayed by display subsystem 205 can have a virtual object distance appropriate for that target location. The environmental feedback system 272 may be a range sensor, camera, or other system.

Content data-based focal point selection 274 enables the system to selectively choose a virtual object distance, based on what is being displayed. For example, the system may selectively choose a portion of the image for focus.

In one embodiment, user input systems 276 enable focus selection based on head tracking, gestures, voice control, and other types of feedback or input systems. Such user input systems 276 may include video game controllers, microphones, cameras, inertial measurement sensors, and other sensors for detecting user input. In one embodiment, user input systems 276 may provide manual inputs, including one or more of sliders, dials, computer-based inputs, etc. In one embodiment, the user inputs systems 276 may be provided by a linked mobile device or other system.

Other control data 278 may also be provided to the system. Any of this data from auxiliary data system 260 may be used to adjust the virtual object distance of one or more image elements. In one embodiment, in addition to auxiliary data system 260, the system may additionally accept manual adjustment 262. In one embodiment, the manual adjustment may be used to correct for the user's optical issues, which sets a baseline for the user. In one embodiment, manual adjustment 262 may provide an initial IPD and diopter setting. In one embodiment, the manual adjustment is stored so that a user may have a customized setting, which may be beneficial if the near-eye display system is shared.

In one embodiment, the near-eye display 200 may provide depth blending. In one embodiment, the system 200 enables depth blending between the focal lengths created using the modulation stack 230. In one embodiment, depth blending uses weighting of pixel values between adjacent planes and sets opacity. This creates an appearance of continuous depth. In one embodiment, the weighting may be linear weighting. In one embodiment, nonlinear optimization techniques may be used. In one embodiment, the image source 210 adjusts the pixel values output, to create such depth blending.

Figure 2B:
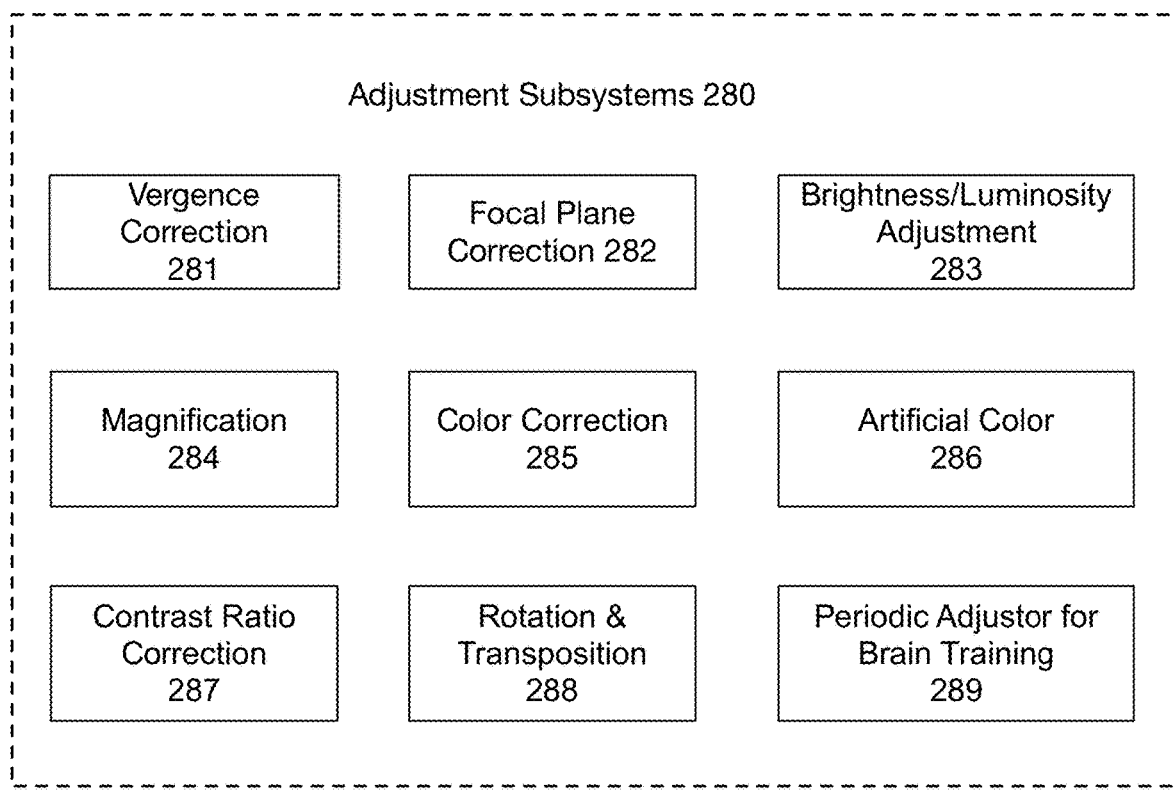
FIG. 2B is a block diagram of one embodiment of the adjustment elements, for customized image adjustment.

FIG. 2B is a block diagram of one embodiment of the adjustment elements, for customized image adjustment.

In one embodiment, the customized image adjustment 280 may use one or more of the following elements: vergence correction 281, focal plane correction 282, brightness/luminosity adjustment 283, magnification 284, color correction 285, artificial color addition for emphasis 286, contrast ratio correction 287, rotation and transposition-based displacement 288, and periodic adjustor for brain training 289.

Figure 2C:
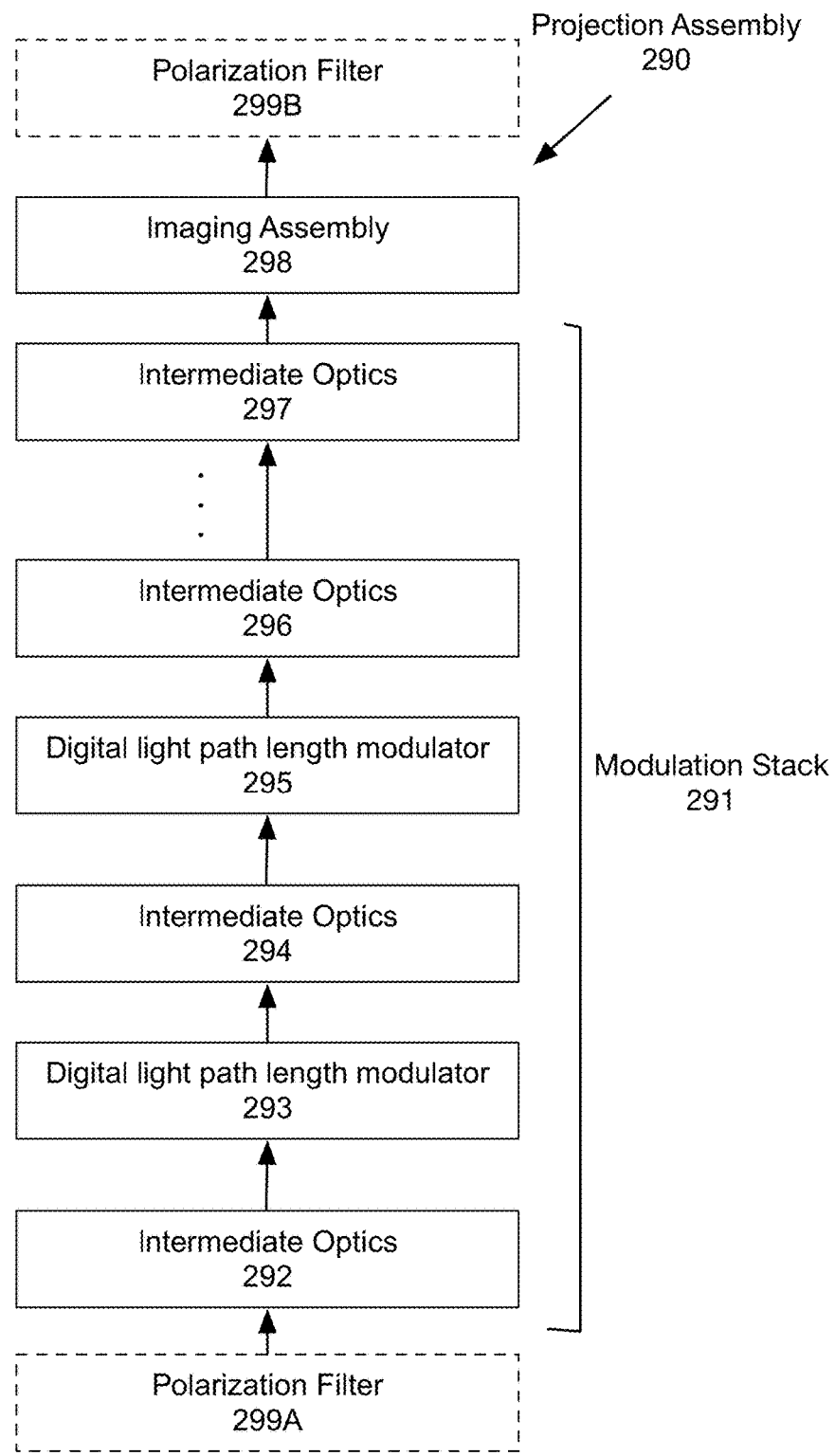
FIG. 2C is a block diagram of one embodiment of a projection assembly.

FIG. 2C is a block diagram of one embodiment of a projection assembly 290. The projection assembly 290, in one embodiment, includes a plurality of digital light path length modulators (293, 295) as well as a plurality of intermediate optics elements (292, 294, 296, 297) together forming a modulation stack 291. In one embodiment, the projection assembly in a real system may include 6-30 elements which include lenses, mirrors, apertures, and the like, referred to as intermediate optics. In one embodiment, the intermediate optics may be interspersed with the digital light path length modulators. In one embodiment, the intermediate optics may be positioned before and/or after the set of digital light path length modulators. In one embodiment, polarization filter 299 may be positioned before 299A or after 299B in the modulation stack 291.

In one embodiment, the projection assembly 290 may correct for chromatic aberration and other irregularities of optical systems.

Figure 3A:
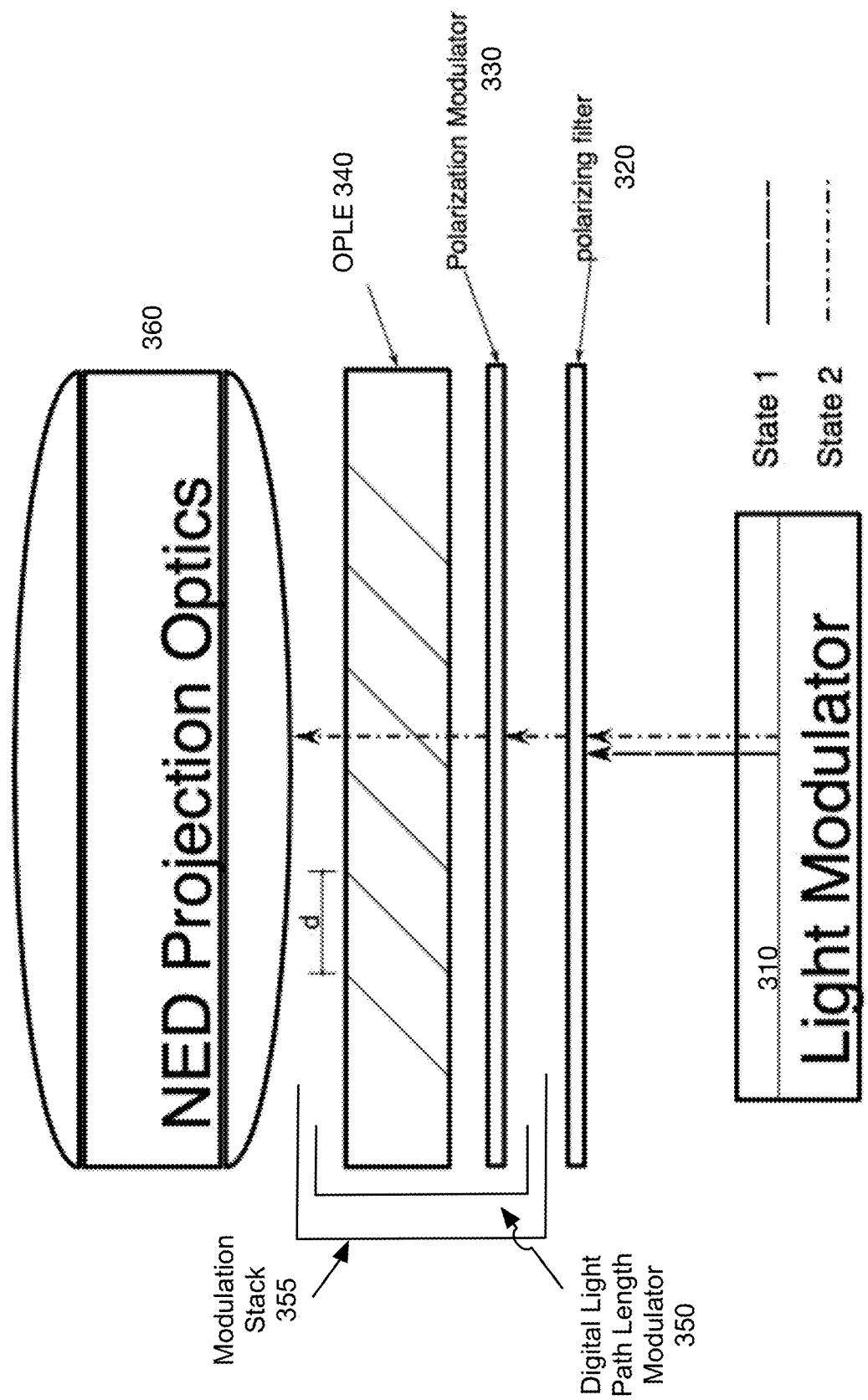

FIGS. 3A and 3B are diagrams of one embodiment of a near-eye display (NED) system including a modulation stack. The light modulator 310 outputs polarized light, both state 1 and state 2 polarized light, in one embodiment. Polarizing filter 320 removes the state 1 polarized light, and passes through state 2 polarized light only.

The modulation stack 355 includes one or more digital light path length modulators 350. For simplicity the illustration here includes a single digital light path length modulator 350. The digital light path modulator 350 includes a polarization modulator 330, which can rotate the polarization of light, and an optical light path extender (OPLE) 340 which selectively extends the light path length, based on the polarization of the light. In one embodiment, the OPLE 340 may be a transverse OPLE or a longitudinal OPLE. These OPLEs are described in co-pending U.S. patent application Ser. No. 15/236,101, filed on Sep. 12, 2016 (14100P0030) and U.S. patent application Ser. No. 15/358,040 filed on Nov. 21, 2016 (14100P0036). incorporated herein by reference.

The polarization modulator 330 in FIG. 3A is "off," leaving the state 2 polarized light to pass through. In this context, the term "on" refers to a setting in which the polarization modulator 330 alters the polarization of light, while the term "off" refers to the setting in which the polarization modulator 330 does not alter the polarization of light.

The OPLE 340 in one embodiment is a transverse OPLE with a plurality of polarization sensitive reflective elements, which reflect state 1 polarized light, while passing through state 2 polarized light. Here, state 2 polarized light is transmitted straight through. The output in one embodiment is transmitted to near-eye display (NED) projection optics 360. Though it is not shown, additional optical elements may be included in this system, including lenses, correction systems, etc. In another embodiment, the OPLE 340 may be a longitudinal OPLE in which the state 1 polarized light is reflected back by a polarization sensitive reflective element.

FIG. 3B is a diagram of the near-eye display system of FIG. 3A with the polarization modulator "on." Here, again, the polarizing filter passes only state 2 polarized light. However, here, the polarization modulator 330 modulates the light, and outputs state 1 polarized light. The state 1 polarized light is reflected by the polarization sensitive reflective elements of transverse OPLE 340, in this illustration. In another embodiment, the polarization sensitive reflective element on the top of the OPLE 340 reflects the state 1 polarized light back through the OPLE 340. Thus, this light goes through a longer light path than the light with state 2 polarization, which is passed through without reflection.

A comparison of FIGS. 3A and 3B shows that the state 1 polarized light has a longer light path through the OPLE than the state 2 polarized light. In this way, a digital light path length modulator 350 can change the light path length. While only a single digital light path length modulator 350 is shown here, a plurality of digital light path length modulators 350 may be stacked to provide a larger number of light path lengths.

FIGS. 3A and 3B show a time sequential embodiment, in which all of the light entering the digital light path length modulator 350 has one polarization, and is either modulated or not modulated by polarization modulator 330. In this example, the system switches between the states shown in FIGS. 3A and 3B, in time. The polarization modulator 330 may use pixel-based polarization to selectively modulate the polarization of a subset of the light impacting at a time, in one embodiment. In one embodiment, modulation may be based on location, time, color, wavelength, and optionally other differentiable factors.

Figure 3C:
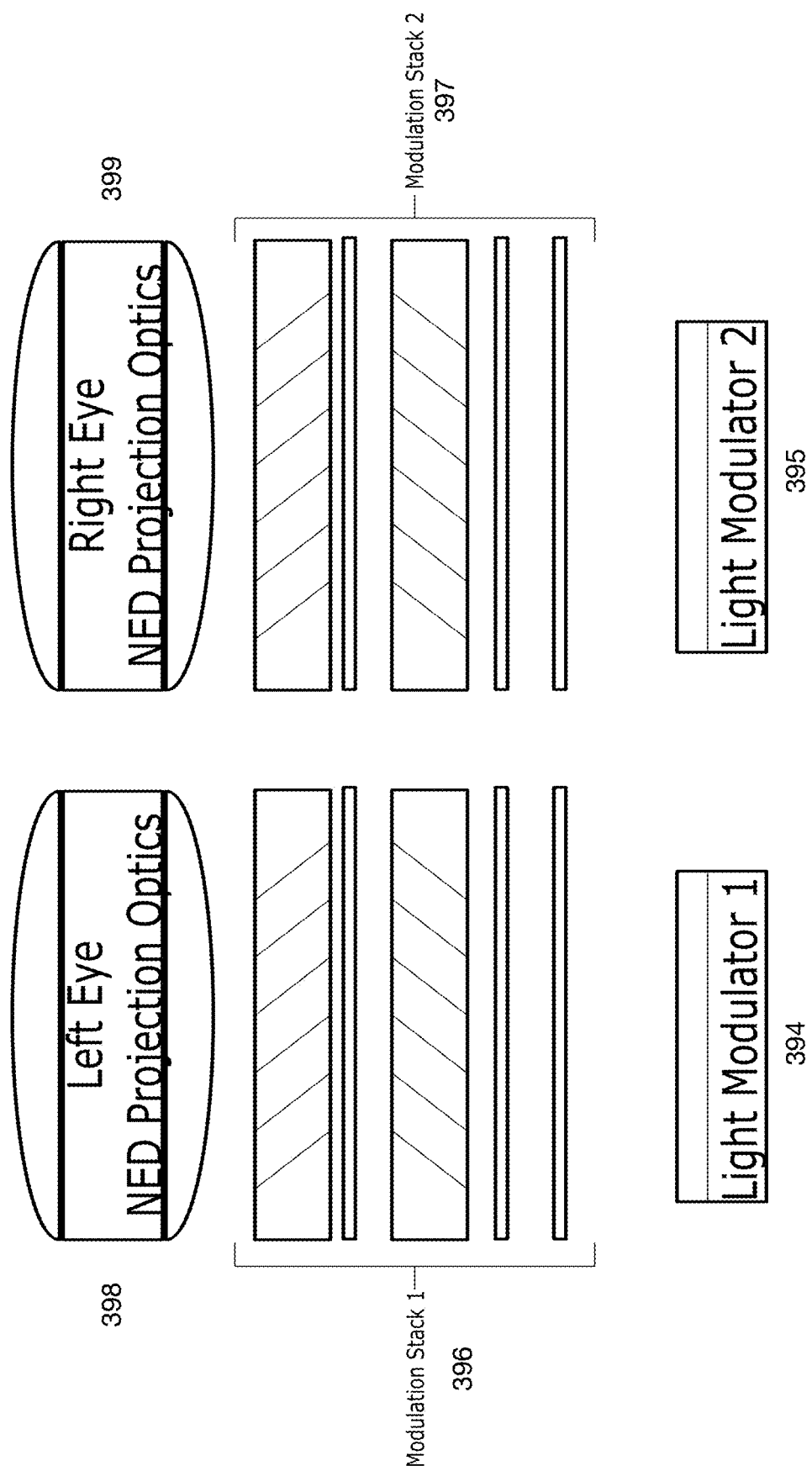
FIGS. 3C-3F are diagrams of embodiments of a digital light path length modulator in a binocular near eye display system.
Figure 3D:
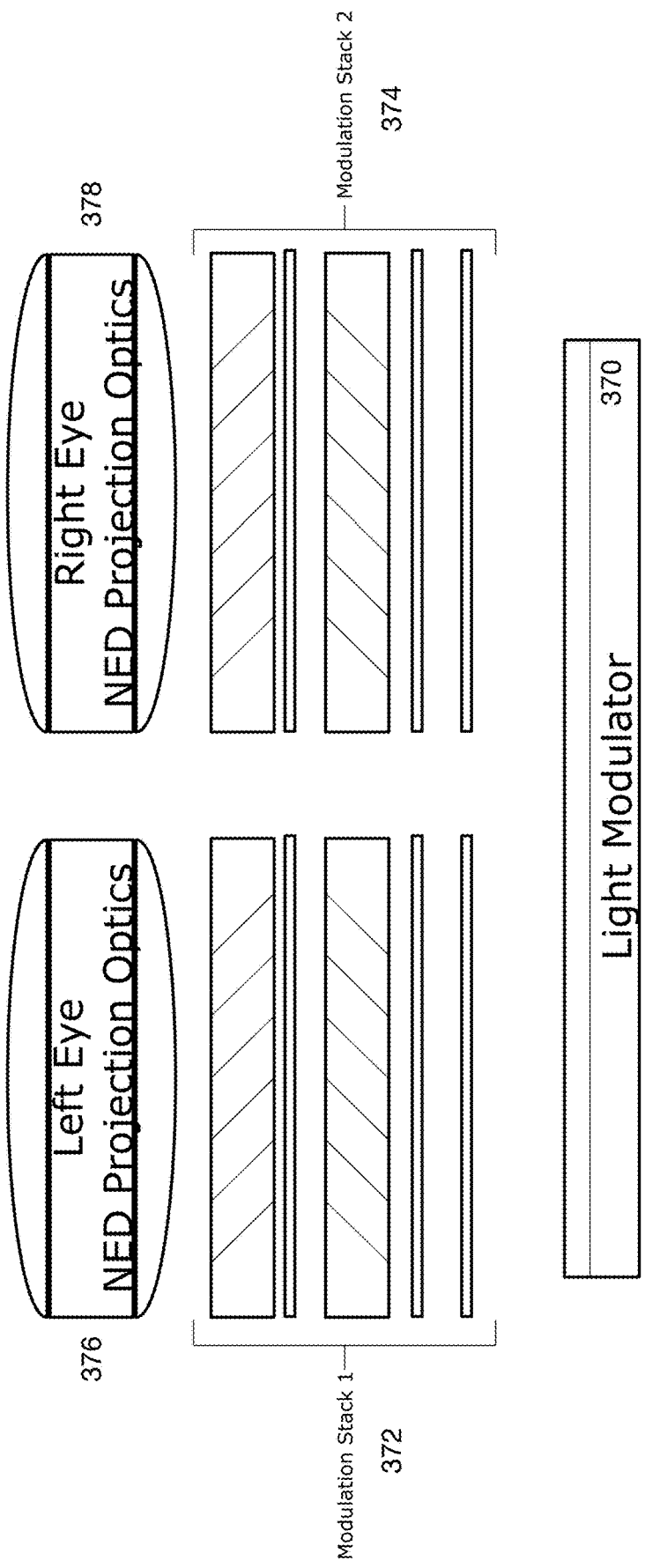
Figure 3E:
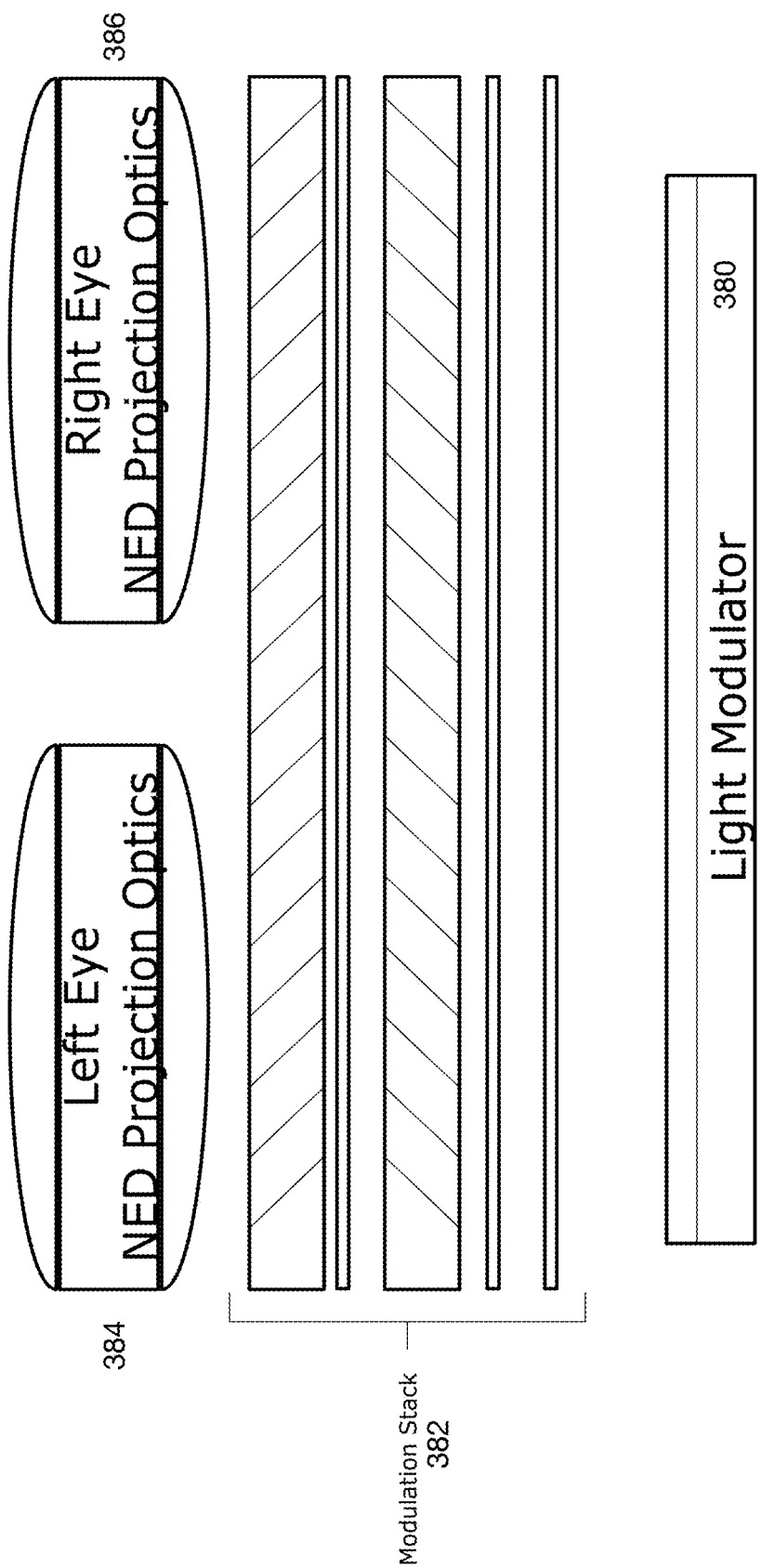

FIGS. 3C-3E illustrate embodiments various configurations for a binocular near-eye display system. FIG. 3C illustrates one embodiment in which the system has fully separate display subsystems, with each eye having a light modulator 394, 395, a modulation stack 396, 397, and projection optics 398, 399.

FIG. 3D illustrates an embodiment in which the left and right eye share a light modulator 370, and each eye has a separate modulation stack 372, 374 and separate projection optics 376, 378. As noted above, the system may share one or more of the light modulator and modulation stack, but generally provides separate projection optics for each eye. In this configuration, the separate modulation stacks 372, 374 each include one or more OPLEs, and polarization modulators. Thus, the system can set path length for each eye independently.

Figure 3F:
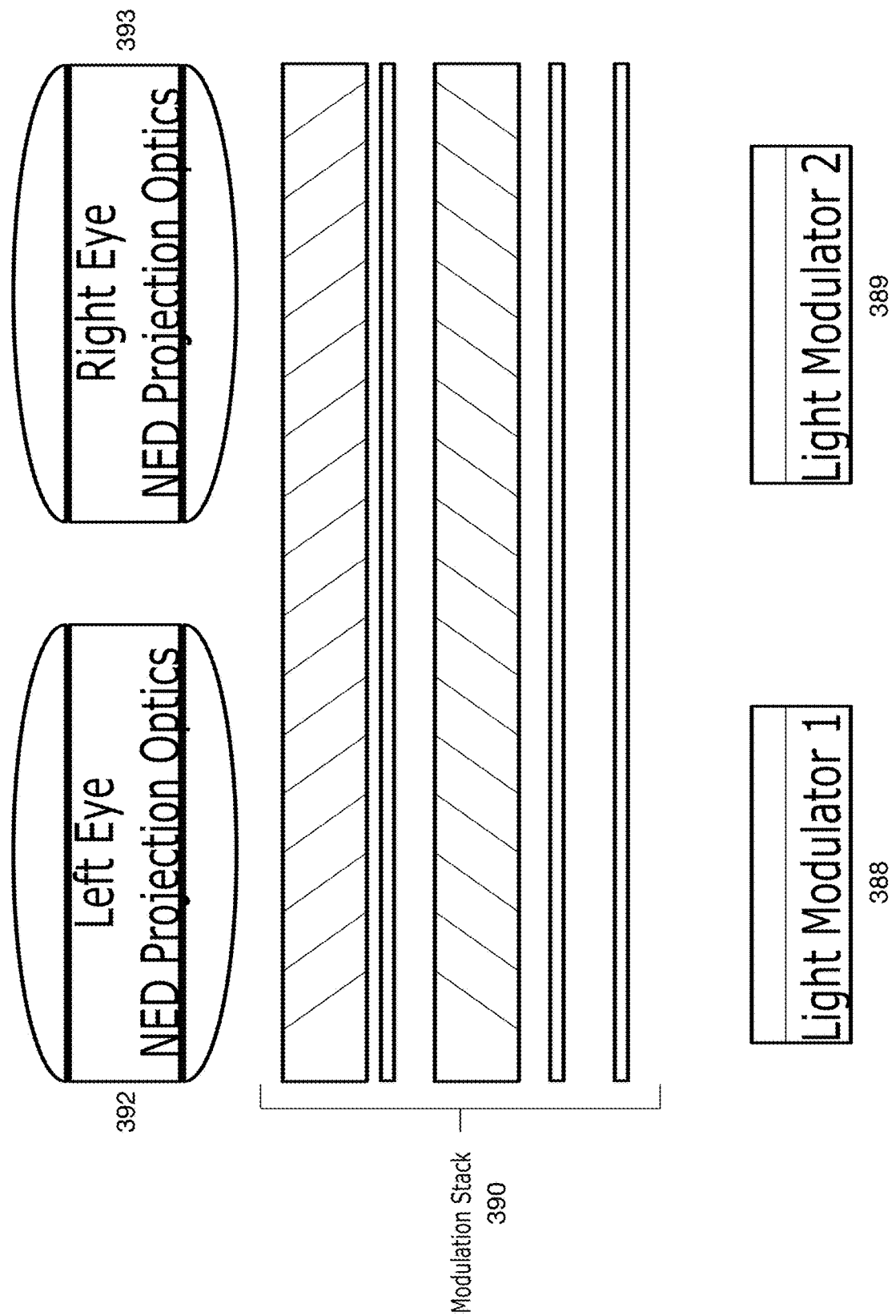

FIG. 3E illustrates a situation in which the system shares a single light modulator 380, and a single modulation stack 382, and each eye has projection optics 384, 386. Because of the positioning of the eyes, and the functioning of the modulation stack, described below in more detail, the light projected for the right eye does not interfere with the light projected for the left eye. In one embodiment, the projection optics 384, 386 may be adjusted manually as discussed above. Subsequently, while displaying a series of images such as a video, the system may adjust the data for both eyes uniformly to maintain continuity of content. The adjustments maintain the matched changes. In one embodiment, when using one shared modulation stack 382 as shown here, the adjustments are made manually or through a separate optical element. In one embodiment, the manual changes may be made by using a knob or other setting tool to set options, and then using the system including the modulation stack 382 to maintain the fixed difference, while adjusting for different image elements and display categories. In another embodiment, the system may maintain the matched changes using the system only, without a separate disparity adjustment mechanism FIG. 3F illustrates one embodiment in which the system has a shared modulation stack 390 but separate light modulators 388, 389 and separate projection optics 392, 393. The binocular system may operate with any of the configurations shown in FIGS. 3C-3F.

In one embodiment, this binocular display system may be used in near-eye displays (NED), as well as a binocular microscope to enable the display to show depth perception and for digital microscopes, recreating a similar eye feel to high powered microscopes. Other uses of the binocular display system may include other types of displays, such as those associated with cameras, binoculars, digital scopes, medical or surgical display systems, endoscope, binocular range finders, etc.

Figure 4:
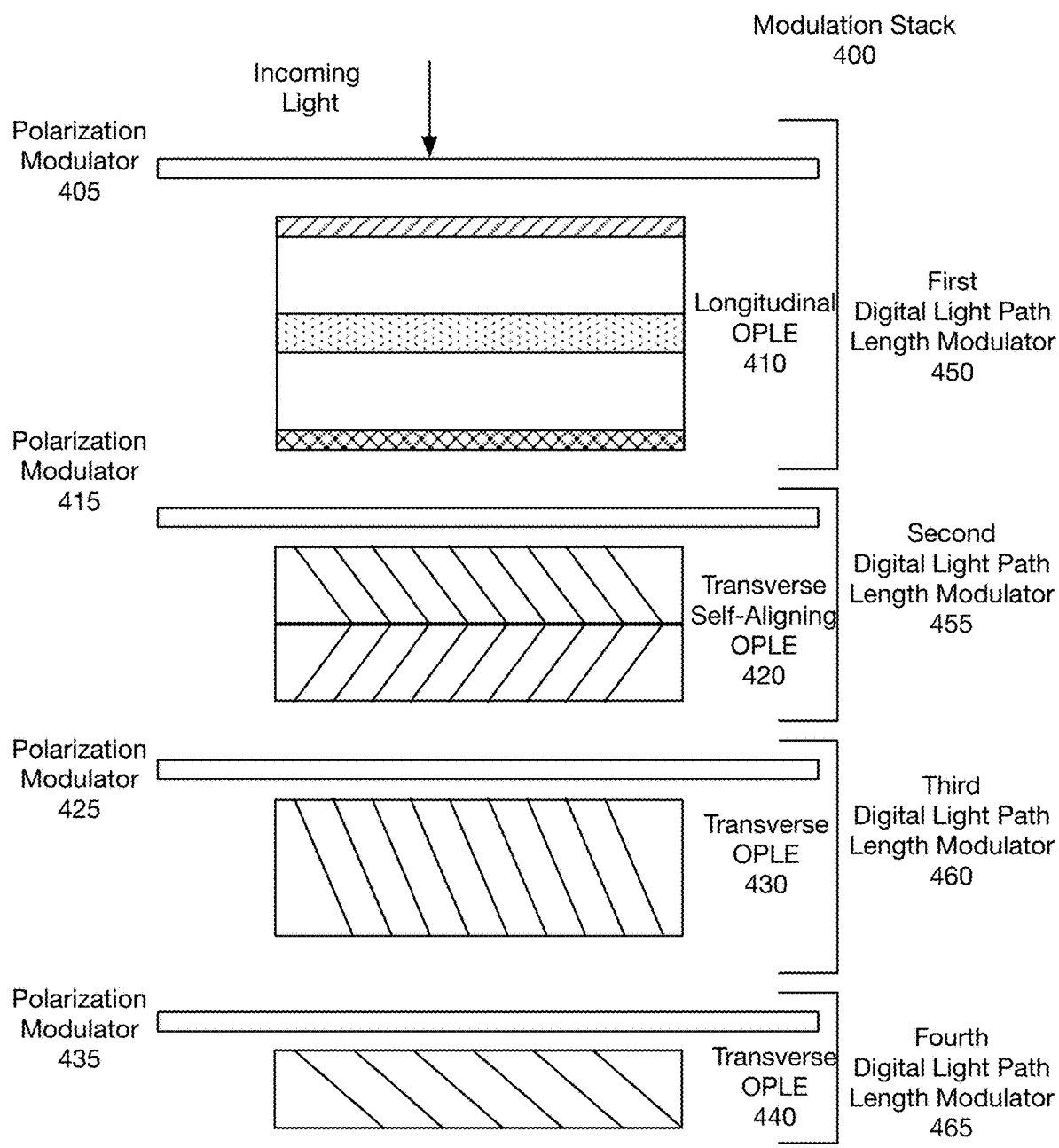
FIG. 4 is a block diagram of one embodiment of a modulation stack including a plurality of digital light path length modulators.

FIG. 4 illustrates one embodiment of a modulation stack 400 including four digital light path length modulators.

The modulation stack includes four digital light path length modulators. Each of the digital light path length modulators 450, 455, 460, 465 includes a polarization modulator and an OPLE. In this example, the first OPLE 410 is a longitudinal OPLE, while the other OPLEs are transverse OPLEs. One of the transverse OPLEs 420 is a self-aligning OPLE.

In various embodiments, one or more of the following variations may be made: the effective thickness of the OPLEs may vary, as may the angles of the polarization sensitive reflective elements, and the OPLE may include one, two, or more plates. The effective thickness of the OPLE is defined as the cumulative thickness of the plates which are parts of the OPLE. Thus the effective thickness of OPLE 420 is different than the thickness of OPLE 440, even though the individual plates in the two OPLEs 420, 440 are identical.

With the shown set of four different OPLEs, the system can create up to sixteen, $2^4$ focal lengths by selectively modulating the polarization, as follows:

| OPLE 1 | OPLE 2 | OPLE 3 | OPLE 4 |
|--------|--------|--------|--------|
| State 1 | State 1 | State 1 | State 1 |
| State 1 | State 1 | State 1 | State 2 |
| State 1 | State 1 | State 2 | State 1 |
| State 1 | State 1 | State 2 | State 2 |
| State 1 | State 2 | State 1 | State 1 |
| State 1 | State 2 | State 1 | State 2 |
| State 1 | State 2 | State 2 | State 1 |
| State 1 | State 2 | State 2 | State 2 |
| State 2 | State 1 | State 1 | State 1 |
| State 2 | State 1 | State 1 | State 2 |
| State 2 | State 1 | State 2 | State 1 |
| State 2 | State 1 | State 2 | State 2 |
| State 2 | State 2 | State 1 | State 1 |
| State 2 | State 2 | State 1 | State 2 |
| State 2 | State 2 | State 2 | State 1 |
| State 2 | State 2 | State 2 | State 2 |

Although the modulation stack may create a plurality of focal planes, in one embodiment the system provides for focal plane blending. Focal plane blending enables placement of elements between focal planes defined by the OPLEs. Focal plane blending creates a perception of intermediate focal planes. This enables the creation of a blended focal plane at a location where the desired position of the virtual object is, corresponding to appropriate parallax.

In one embodiment, because the light exits from both sides of a longitudinal OPLE, the longitudinal OPLE 410 is preferentially a first OPLE in a modulation stack 400 that includes longitudinal OPLEs. In one embodiment, the number of longitudinal OPLEs 410 is limited by the level of light loss for each longitudinal OPLE.

The figures of 5A-5C illustrate the use of transverse OPLEs for light path extension. FIG. 5D illustrates the use of a longitudinal OPLE. One of skill in the art would understand that many of the illustrations and discussion below, with respect to transverse OPLEs apply to longitudinal OPLEs as well.

Figure 5A:
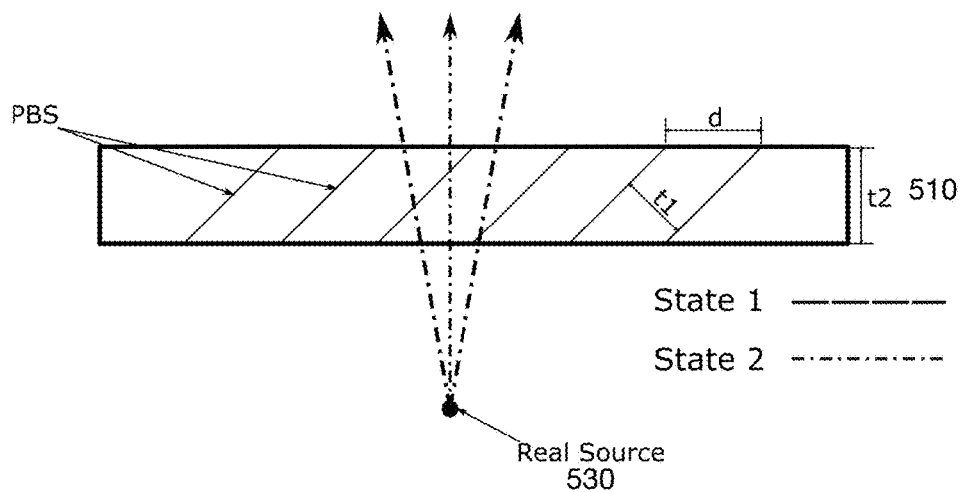
FIG. 5A illustrates one embodiment of the effect of using a transverse OPLE with non-reflected light.

FIG. 5A illustrates one embodiment of the effect of using a transverse OPLE 510, with a light source for non-reflected light. The light source is real source 530. As can be seen, in this example, for state 2 polarized light which is not reflected by the polarization sensitive reflective elements, the real light source 530 and the "virtual" or perceived light source are in the same position. This figure additionally shows that for a real light source 530, light travels in a cone, rather than a straight light as is usually illustrated for simplicity.

Figure 5B:
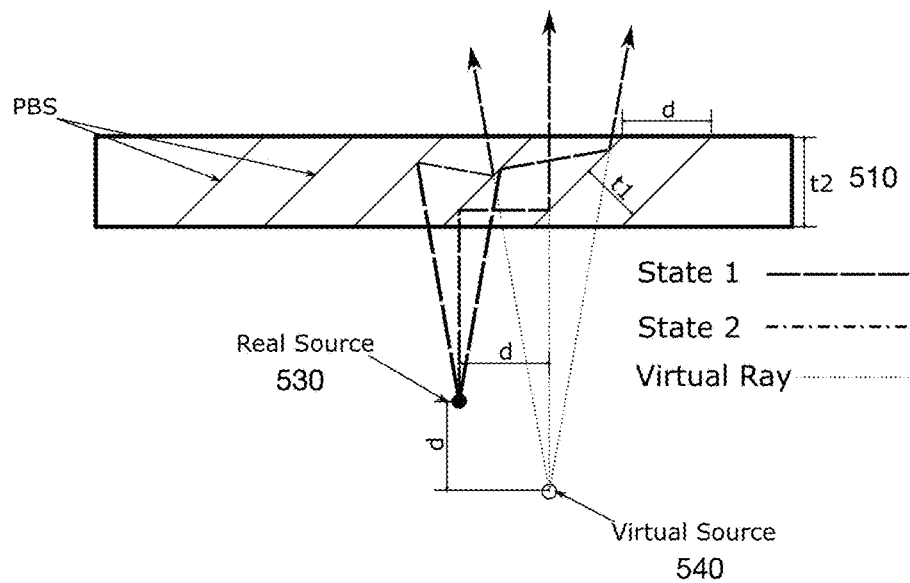
FIG. 5B illustrates one embodiment of the effect of using the OPLE of FIG. 5A, with reflected light.

FIG. 5B illustrates one embodiment of the effect of using the OPLE 510 of FIG. 5A, with a light source for reflected light. In this illustration, state 1 polarized light is reflected. Thus, the user's perceived "virtual light source" 540 is spatially shifted from the real light source 530. The lengthening of the light path shifts the virtual source vertically, while the movement of the light caused by the bounce shifts the apparent light source horizontally. In the example shown, the virtual light source is shifted to the right and back. The virtual rays show that the user's perception tracks back the light, to perceive the virtual source.

Figure 5C:
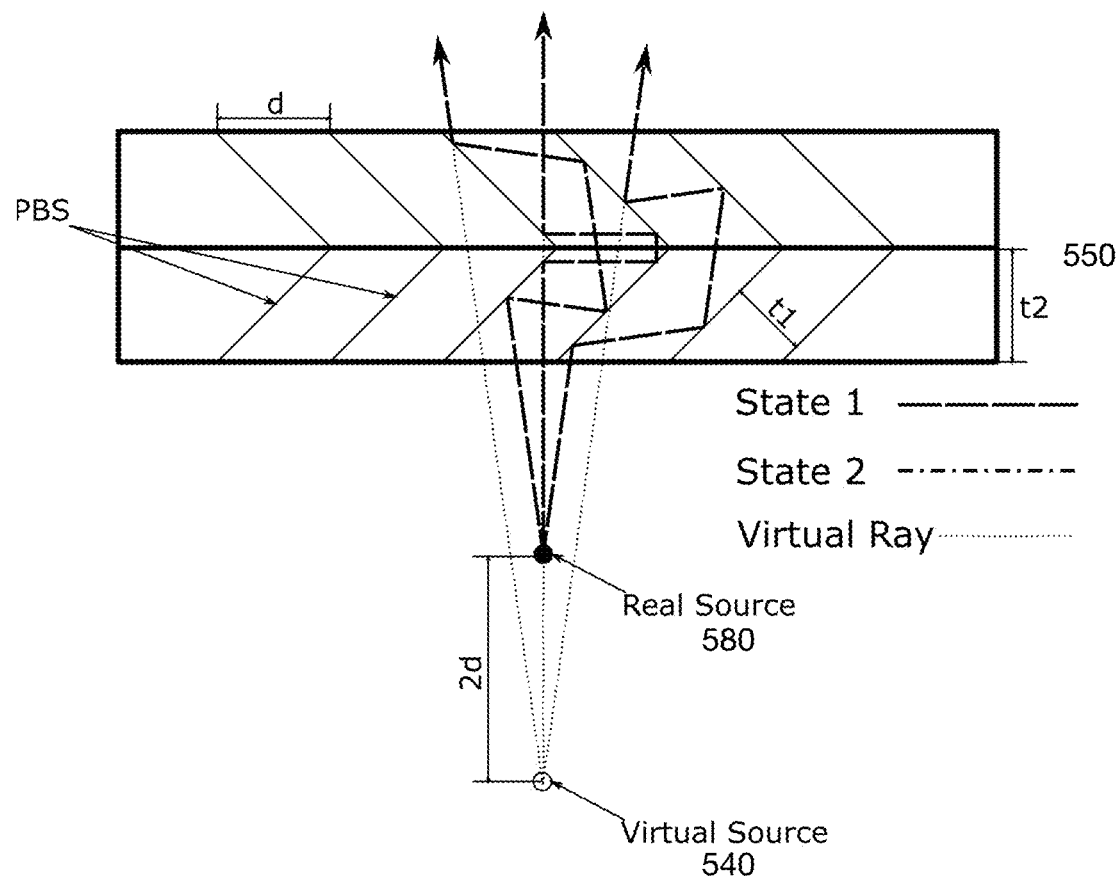
FIG. 5C illustrates one embodiment of the effect of using a self-aligned OPLE, with reflected light.
Figure 5D:
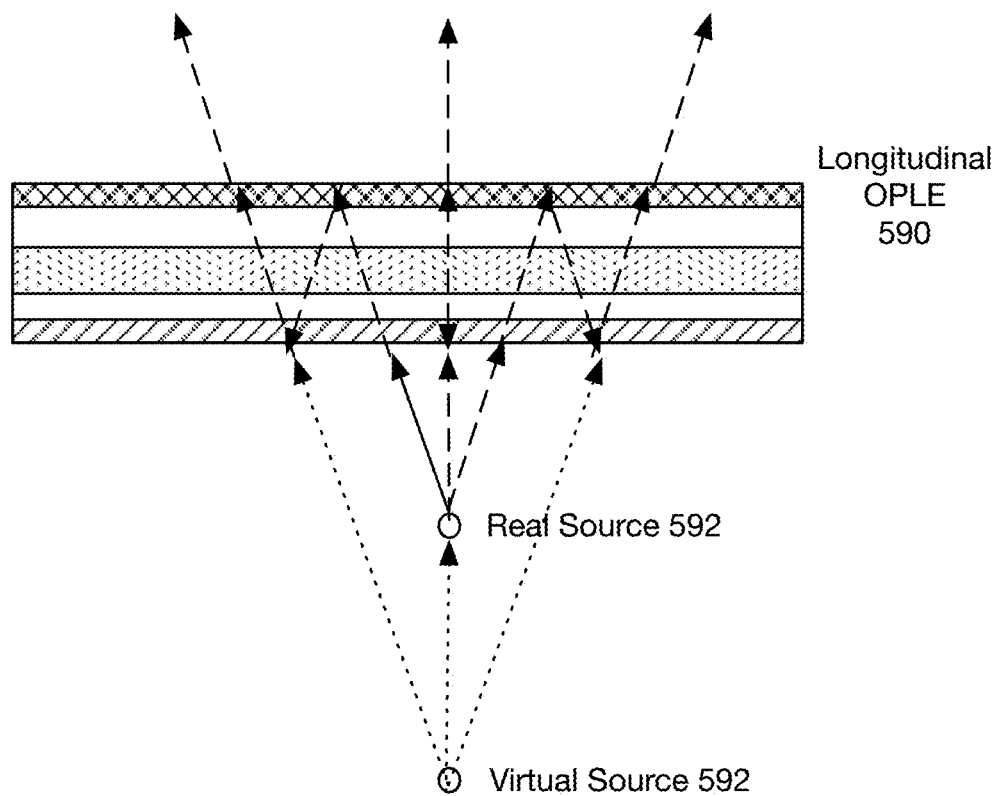
FIG. 5D illustrates one embodiment of using a longitudinal OPLE.

FIG. 5C illustrates one embodiment of the effect of using a self-aligned transverse OPLE 550, with a light source, for reflected light. As can be seen, by using the self-aligned OPLE 550, the virtual light source 540 appears to be further away (e.g. lengthening the virtual object distance) from the real source 580, but not shifted in position. Although the self-aligned OPLE 550 shown in FIG. 5C has no gap between the plates, a gap, including a gap with additional optical elements, could continue to provide this self-alignment feature. Furthermore, while the two plates in the shown self-aligned OPLE 550 are matched, they need not have an identical thickness or angle for the polarization sensitive reflective elements, as discussed above.

FIG. 5D illustrates one embodiment of a longitudinal OPLE 590, with a light source for reflected light. As can be seen, by using the longitudinal OPLE, the virtual light source 592 appears to be further away (e.g. lengthening the virtual object distance) from the real source 592, but it is not shifted in position. The center line, illustrating light traveling in a straight line is reflected from the top surface, then the bottom surface, before exiting the OPLE 590. This can be more clearly seen in the light shown impacting at an angle.

Figure 5E:
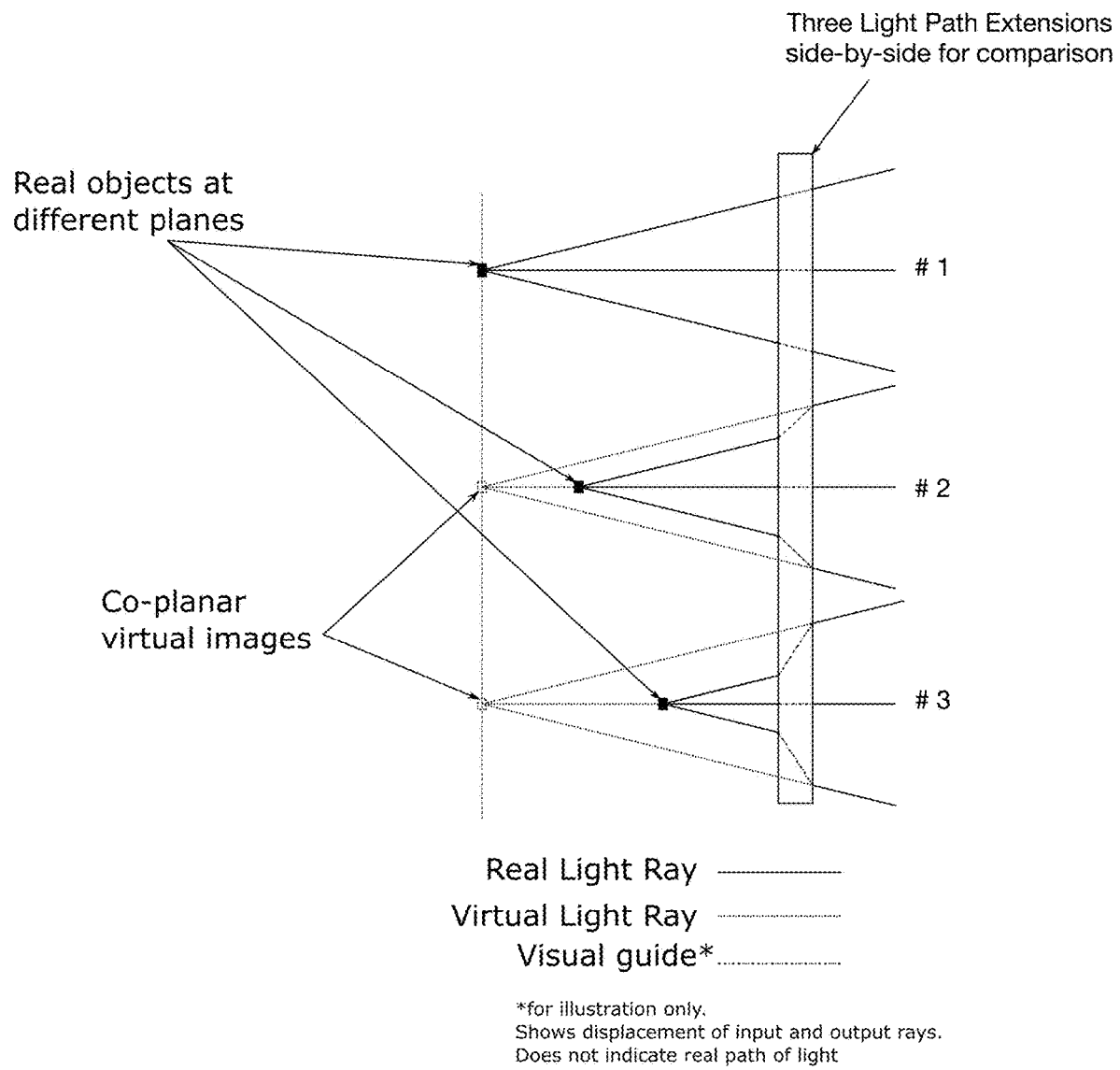
FIG. 5E illustrates an example of light path extensions and the effect on a display.

FIG. 5E shows the effect of light extension on a perceived image. The illustration shows three degrees of light extension side by side, for comparison. The first one passes the light without any lengthening, so the image is perceived at the focal plane of the display. The second one lengthens the light path, which causes the user to perceive the image at a different focal plane. The third one lengthens the light path further, which causes the user to perceive a virtual image at a third focal plane. Thus, by controlling the length of the light extension, a system can create virtual images and image elements at various focal points. Using the digital light path length modulator, the system can adjust the light path digitally, and selectively position virtual images at various virtual object distances.

Figure 6:
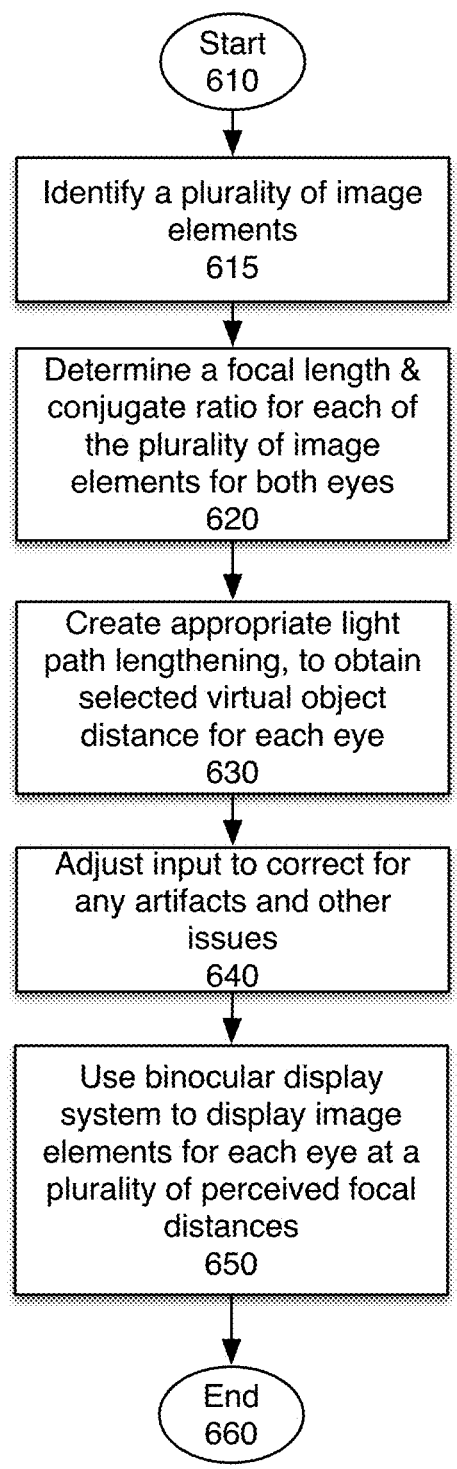
FIG. 6 is a flowchart of one embodiment of using the binocular display system including multiple focal planes.

FIG. 6 is a flowchart of one embodiment of using the binocular display system including multiple focal planes. The process starts at block 610. In one embodiment, this process is continuously active when images, whether still images of frames or subframes of video images, are being displayed.

At block 615, a plurality of image elements are identified. The image elements may be in the same image frame, or may be in separate subframes.

At block 620, the focal length and conjugate ratio is determined for each of the plurality of image elements, for both eyes. This is based on the intended virtual location for each image element, based on one or more of the user's intention, the creator's intention, and the user's physical circumstances.

At block 630, appropriate light lengthening is selected, to place the virtual object distance at the selected distance for image element. As noted above, this may be done on a per frame or per pixel basis.

At block 640, the input is adjusted to correct for any artifacts created by the light path lengthening, and other issues. Other issues may include vergence-based disparity correction, luminosity correction, amblyopia correction, different perceived focal planes, perceived focus adjustments, etc. In one embodiment, the system may adjust color to assist with color blindness, or decreased color perception. The adjustment may include adjusting color differentials, removing noise in the color overlap region, or artificial color fringing. In one embodiment, this adjustment is done by the digital correction system 215A/B, for each eye. The digital correction system 215A/B in one embodiment adjusts the output of light source 217A/B to account for these issues, as well as for artifacts.

At block 650, the process uses the binocular display system to display image elements for each eye at the plurality of perceived focal distances. The process then ends at block 660. Note that while the process is shown as ending, as long as there are further image elements to display, the process continues.

Figure 10:
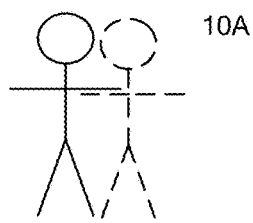
FIG. 10 illustrates some of the exemplary corrections that may be made using the binocular system.
Figure 10:
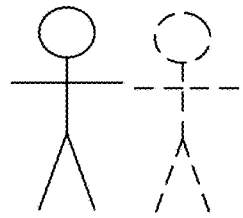
Figure 10:
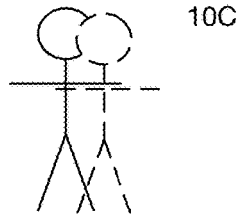
Figure 10:
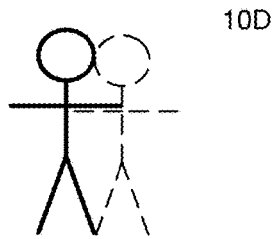
Figure 10:
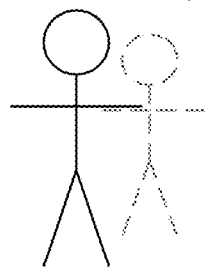
Figure 10:
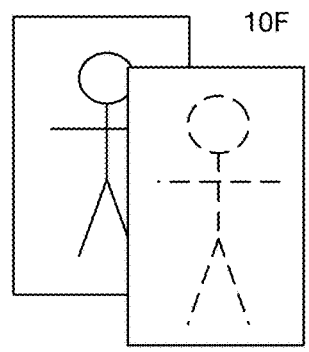
Figure 10:
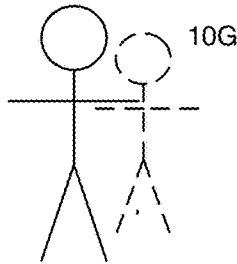
Figure 10:
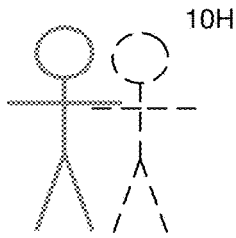

FIG. 10 illustrates some of the exemplary adjustments. An adjustment or correction may be referred to as a "display differential," representing a difference in the image element (s) presented to one or both of the eyes of the user from the no correction state. For example, for someone with perfect vision there may be no display differential (10A).

If there is a vergence disparity, the vergence-based disparity correction may place the image elements further apart (10B) or closer together (10C) so that the perceived placement is correct. There may be brightness or luminosity correction (10D) if the two eyes do not perceive light the same way. In one embodiment, there may be inter-scene contrast ratio correction, by adjusting the brightness of elements relatively to each other for the whole, or portions of the image.

For amblyopia, the image element may be moved, and made less bright for the dominant eye, to force the other eye to work (10E). For different prescriptions (diopters), the perceived focal planes may be shifted (10F), so that despite having different prescriptions for each eye, the two eyes perceive the image elements on the same plane (or on different planes, as designed by the data.) For some vision problems, the system may provide differential magnification, to fix the effect of some vision problems. This may be done for the whole scene, so that the user's eyes perceive images at the same size. In one embodiment for monovision correction or strong eye dominance, which causes 3D fusion problems, the system may provide correction as well. In one embodiment, the correction may include altering one of the images, as shown. In one embodiment, the correction may include alternating the image displayed between the eyes. In one embodiment, the correction may include other changes. In one embodiment, the system may try various modifications to provide an experimental correction, based on the user's reaction. Because people with vision issues have different reactions to such corrections, in one embodiment, the processor may run through an experimental correction protocol, which utilizes various correction methods, and evaluates the user's response using eye tracking mechanisms and biometric systems, and user feedback to identify an optimal correction. In one embodiment, such experimental correction protocols are made available under supervision by a medical or other trained professional.

In one embodiment, there may be different color levels, for contrast. (10H). In one embodiment, the system can adjust color overall for generic color blindness. The color adjustment may remove noise, and overlap between the colors. In one embodiment, the system may also adjust the focal planes by color. The system may also selectively adjust color for one eye for color blindness or reduced color sensitivity in one eye due to macular degeneration or other causes. In one embodiment, the system may add artificial color fringing to provide focus clues. In one embodiment, the system may add a blur filter, to the entire image, to a portion of the image, or by color, to create a perceived focus adjustment. In one embodiment, a whole scene may be positioned in one focal plane, based on where the user is looking, and the elements that the user is not focused on may be artificially blurred.

In one embodiment, the system also provides rotational displacement or transposition, in addition to the changes shown in FIG. 10. In one embodiment, this is done with respect to the bounding reality box (e.g. within the field of view). In one embodiment, the transposition may be different for the two eyes, to address the limits of binocular fusion. In one embodiment, by taking auxiliary data, the system can change the orientation and focal plane, and make disparity changes as needed, as the user moves around, tilts the head, etc. Disparity correction is ensuring that the parallax of the eyes is positioned so that the user's focus is at the correct location. A disparity is the angular misalignment of the images perceived by the two eyes that makes it difficult for the user's brain to fuse the images and perceive the scene as a single coherent scene. Because of the differences in perceptions of the right and left eye, the system applies disparity correction. All of these corrections are in the software, in adjusting the data output by the digital correction system and adjusting the modulation stack to position the image with the right color and brightness at the right focal plane.

In one embodiment, the system dynamically matches vergence and focus, and adjusts these elements in real time. For an augmented or mixed reality system, the display may additionally be adjusted based on external clues. For example, an image may be positioned on a wall, even as the user moves closer to or further away from that wall.

In one embodiment, the correction is to account for the parallax and focal shift, based on the real perception of the user, rather than the idealized perception assumed by a default system.

In one embodiment, the system, because it is fully adjustable on a binocular basis, may be used to train the brain, by changing parameters from the initial values to the more optimized values. The brain adjusts to the images being shown.

For example, if a user has a strongly dominant eye, generally the dominant eye provides resolution and the non-dominant eye only provides depth cues. However, the system can adjust for this, by adjusting luminosity to shift dominance. In one embodiment, the system may alternately or additionally adjust the distance of the object shown to the dominant eye. This can force the brain to learn and adjust. Thus, in one embodiment, the system may be used to train the user's brain, to compensate for existing eye issues. For example, for developmental amblyopia, the system may force the lazy eye to focus by placing the image shown to the dominant eye out of focus, or in soft focus. In one embodiment, the system may be used to train the eyes for cross-dominant shooters (e.g. to enable someone who needs to be able to adjust eye dominance to learn to do so.) In one embodiment, the system may slowly adjust these factors, focus, magnification, luminance, focal plane, and vergence digitally. By combining such changes with testing, the system may be to improve vision. Additionally, by adjusting the display and forcing the user's vision to compensate, the system may be used for lengthening some muscles differentially for therapeutic reasons.

Figure 7:
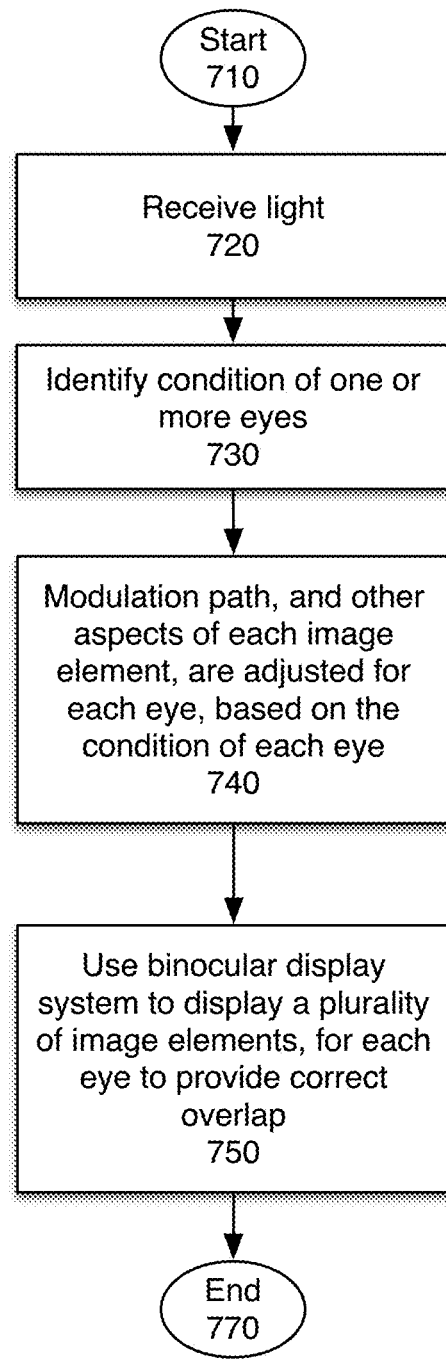
FIG. 7 is a flowchart of one embodiment of adjusting the display to correct for defects of the eyes.

FIG. 7 is a flowchart of one embodiment of adjusting the display to correct for defects of the eyes. The process starts at block 710. At block 720 light is received for display. At block 730, the condition of one or both of the eyes of the user are identified. The conditions may include myopia and/or hyperopia (near sightedness and/or far sightedness, astigmatism, glaucoma, color blindness, amblyopia, presbyopia, and other known conditions which alter the ability of the eyes to perceive objects. In one embodiment, these conditions may be specified by a user. In one embodiment, some settings, for example diopters, may be manually set by the user. In one embodiment, the user may have a separate setting based on whether he or she is wearing prescription glasses or contacts. In one embodiment, the system is designed so it can be utilized with and without corrective lenses. In one embodiment, some conditions, such as amblyopia, may be automatically detected by the eye tracking system, which can determine the focus location of each eye.

At block 740, the modulation path and other aspects of the image element are adjusted for each eye, based on the condition of the eye, and external conditions, if appropriate.

At block 750, the binocular display system is used to display a plurality of image elements, for each eye, providing the correct parallax.

Figure 8:
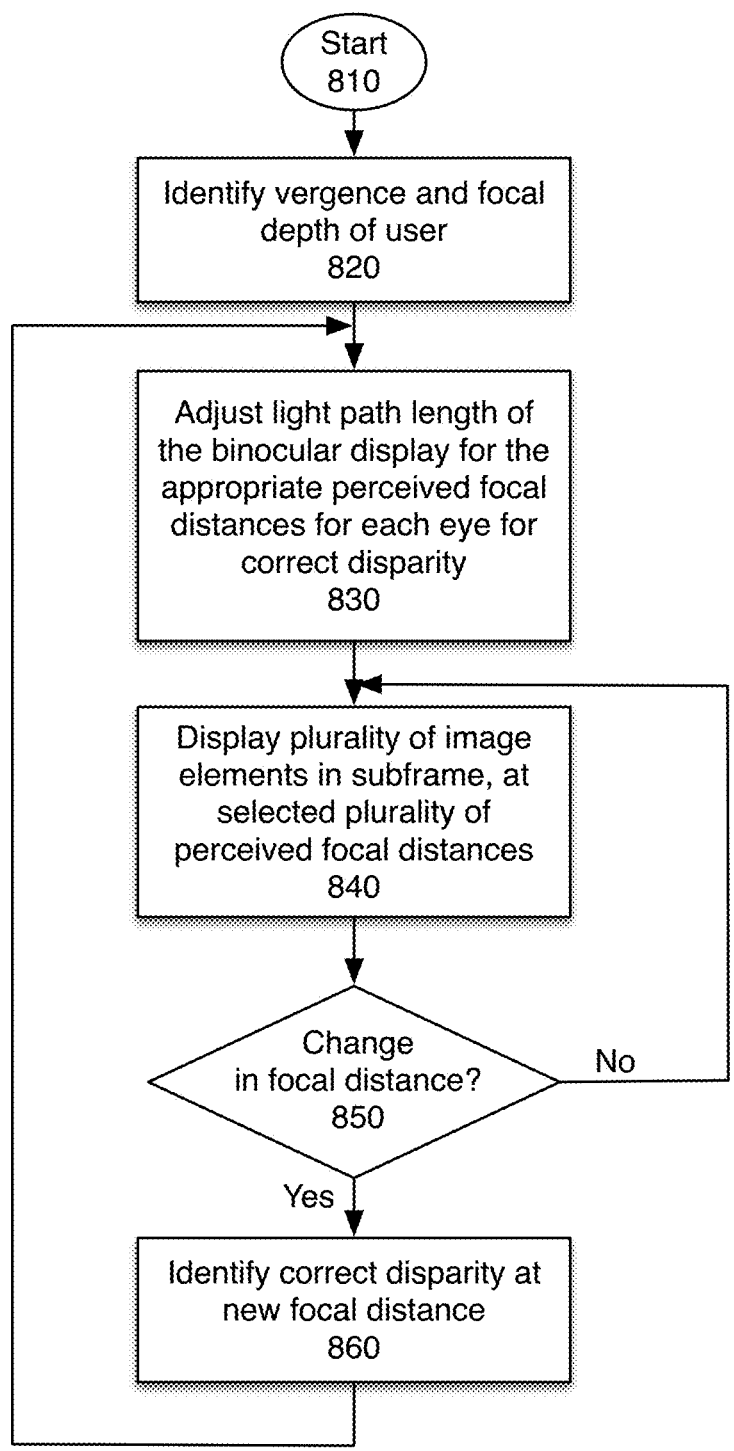
FIG. 8 is a flowchart of one embodiment of using the binocular display to create the correct disparity.

FIG. 8 is a flowchart of one embodiment of using the binocular display to create the correct disparity. The process starts at block 810.

At block 820, the vergence and perceived focal distance of the user is identified. In one embodiment, this may be done by observing the user's eyes as test images are displayed. In one embodiment, this may be done via user input. In one embodiment, this may be done by receiving user feedback during display of a plurality of test images or other content. In one embodiment, this may be done by requesting feedback from a user, the feedback reflecting a comparison of real objects in the environment and displayed object in the binocular NED system.

At block 830, the light path length is adjusted for each eye of the binocular display for the appropriate perceived focal distances and image element locations for correct disparity.

At block 840, the plurality of image elements are displayed in a plurality of subframes at the selected plurality of perceived focal distances.

At block 850, the system determines whether the focal distance should be changed. If so, at block 860 the new correct focal distance and parallax are identified, based on the user data and the data in the content being presented. Otherwise, the process returns to block 840 to display the next plurality of subframes. In this way, the system continuously adjusts the data being displayed to account for both the vergence and perceived focal distance of the user, as the data changes. In one embodiment, the system performs the differential adjustment of block 830 once when initially setting up the system. Thereafter, the data for both eyes are adjusted uniformly, to maintain continuity of content. Thus, as focal distance changes, the system maintains the needed disparity between the eyes. In one embodiment, this process does not utilize eye tracking. Rather, the known focal distance and vergence data is used.

Figure 9:
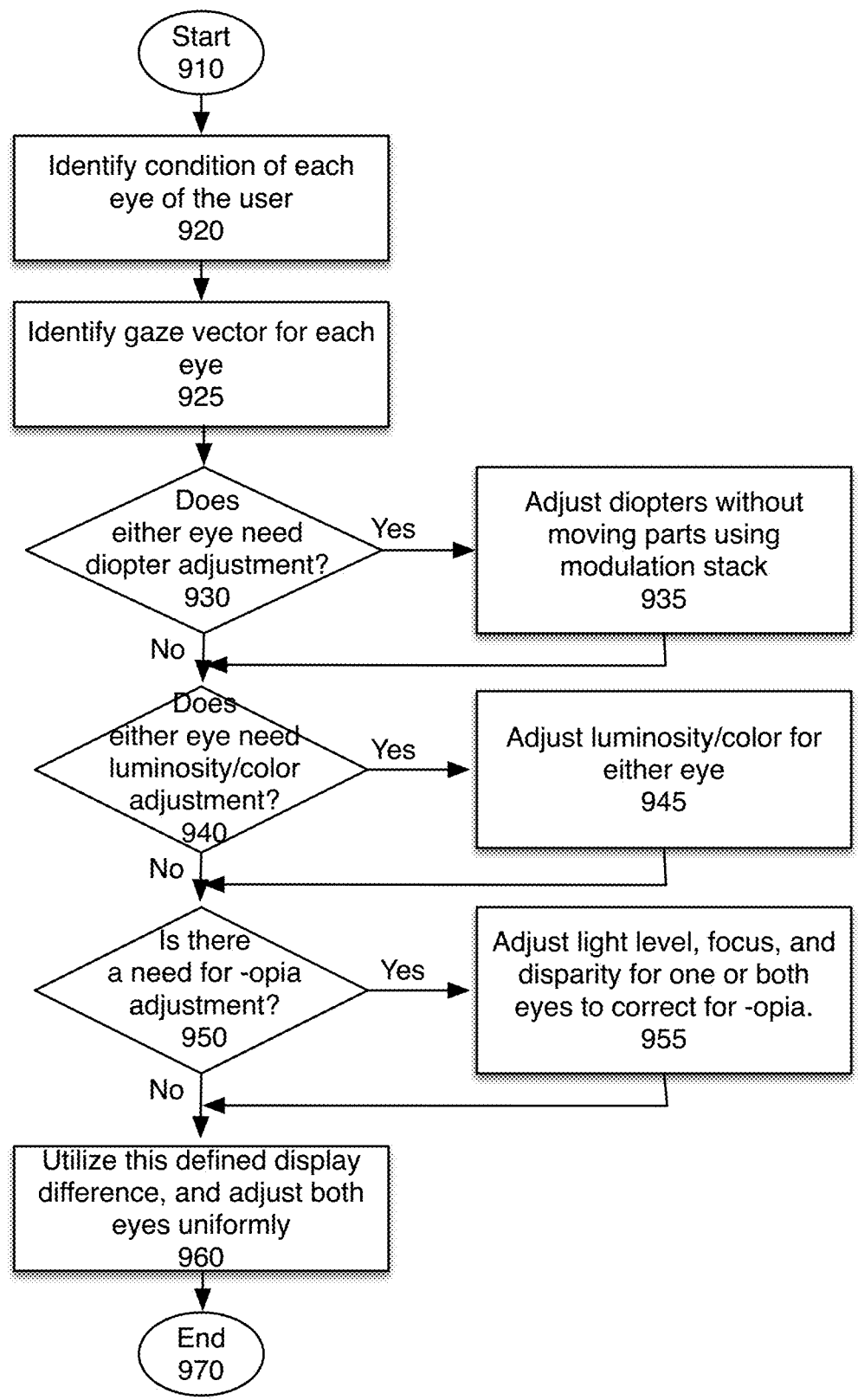
FIG. 9 is a flowchart of one embodiment of using the binocular display to match vergence, focus, and disparity.

FIG. 9 is a flowchart of one embodiment of using the binocular display to match vergence, perceived focal distance, and parallax. The process starts at block 910. At block 920, the condition of each eye of the user is identified. This may be done based on data entered by the user, or a medical professional. Alternatively, testing of the user's eyes may be used to produce this data.

At block 925, the gaze vector of the user's eye is identified. The gaze vector is detected, in one embodiment, using eye tracking. At block 930, the process determines whether either eye needs a diopter adjustment. If so, at block 935, diopters are adjusted. In one embodiment, diopters may be adjusted without moving parts, using the modulation stack and image source. In one embodiment, the diopter adjustment may be a manual adjustment. In one embodiment the distance between the two eye pieces of the binocular display may also be adjusted to conform to the IPD (inter-pupillary distance) of the user.

At block 940, the process determines whether either eye needs a luminosity or color adjustment. If so, at block 945, the luminosity and/or color is adjusted for the appropriate eye(s).

At block 950, the process determines whether there is a need for an opia adjustment. Opias are visual disorders which change the user's ability to perceive image data, ranging from myopia to amblyopia and presbyopia, and others. If there is such an adjustment needed, the light level, focus, disparity, color, or other aspect of the display are adjusted, as needed at block 955.

At block 960, the defined display difference between the user's eyes is stored, in one embodiment. This display difference is maintained as a fixed difference while adjusting through different display categories, in one embodiment. In one embodiment, the difference may change based on the perceived focal distance, for example, utilizing a different adjustment at different perceived focal distances. The display difference, defines the differential between the user's two eyes.

The process then ends, at block 970. In one embodiment, these settings are maintained and utilized for the user, adjusting the display data in real-time. In one embodiment, some of these adjustments may be precalculated. The adjustments may be made by image source (either altering the light level from light source, or adjusting other aspects via digital correction system), by the modulation stack, or by intermediate optics within the display system. In one embodiment, a combination of these elements may be used to provide the controls contemplated.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A binocular display system to display an image to a user comprising:
    an illumination assembly to provide light; and
    a first eye subsystem including a first modulation stack for a first eye of the user comprising a first set of one or more digital light path length modulators to adjust a light path length;
    a second eye subsystem, including one of a second modulation stack for a second eye of the user comprising a second set of one or more digital light path length modulators to adjust the light path length or utilizing the first modulation stack for the second eye of the user;
    a first imaging assembly to create a first plurality of image portions at a plurality of focal lengths for the first eye, from the light output by the first modulation stack;
    a second imaging assembly to create a second plurality of image portions at a plurality of focal lengths for the second eye, from the light output by one of the second modulation stack or the first modulation stack;
    wherein the first and second plurality of image portions together provide a correct parallax of images for a three-dimensional effect.

2. The binocular display system of claim 1, wherein the first modulation stack adjusts a focal length by altering the polarization of the light one or more times as the light passes through the first set of digital light path length modulators.

3. The binocular display system of claim 1, wherein a display difference between the first and the second plurality of image portions corrects for amblyopia, presbyopia, strabismus, and other eye problems.

4. The binocular display system of claim 1, wherein each of the first imaging assembly and the second imaging assembly provide monocular focal cues.

5. The binocular display system of claim 1, further comprising:
    one or more eye tracking mechanisms to identify a vergence angle; and
    the binocular display system to adjust locations of the first and the second plurality of image portions based on the vergence angle.

6. The binocular display system of claim 1, further comprising:
    providing the plurality of focal lengths for each eye with the first modulation stack.

7. The binocular display system of claim 1, wherein an initial adjustment corrects for a difference between the eyes of the user, and further changes are matched by adjusting for both eyes of the user to maintain continuity of content.

8. The binocular display system of claim 1, further comprising:
    the illumination assembly adjusting a display difference comprising one or more of: brightness/luminosity, magnification, focal plane, and color to compensate for a condition of the eyes of the user.

9. The binocular display system of claim 8, further comprising:
    the illumination assembly adjusting the display difference over time to trigger an adjustment in the user's perception, to improve the condition of the eyes.

10. A binocular display system to display an image to a user comprising:
    a first display element comprising:
        a first illumination assembly,
        a modulation stack including a first set of one or more digital light path length modulators to adjust a light path length, and
        an imaging assembly to create a first plurality of image portions at a plurality of focal lengths for a first eye, from the light output by the modulation stack;
    a second display element for a second eye of the user comprising:
        a second imaging assembly to create a second plurality of image portions at a plurality of focal lengths for the second eye;
    wherein the first and second plurality of image portions together provide a correct parallax of images for a three-dimensional effect.

11. The binocular display system of claim 10, wherein the second display element utilizes one of:
    a different modulation stack and a different illumination assembly;
    a different modulation stack, and the illumination assembly of the first display element;
    the modulation stack of the first display element and a different illumination assembly; or
    the modulation stack of the first display element and the illumination assembly of the first display element.

12. The binocular display system of claim 10, wherein the modulation stack adjusts a focal length by altering the polarization of the light one or more times as the light passes through the first set of digital light path length modulators.

13. The binocular display system of claim 10, wherein a differential between the first and the second plurality of image portions corrects for amblyopia, presbyopia, strabismus, and other eye problems.

14. The binocular display system of claim 10, wherein each of the first imaging assembly and the second imaging assembly provide monocular focal cues.

15. The binocular display system of claim 10, further comprising:
    one or more eye tracking mechanisms for the first eye, and a second eye tracking mechanism for the second eye together provide binocular eye tracking, the binocular eye tracking identifying a vergence angle; and
    the binocular display system to adjust locations of the first and the second plurality of image portions based on the vergence angle.

16. The binocular display system of claim 15, further comprising:
    providing different adjustments, to allow for different focal cues for each eye.

17. The binocular display system of claim 10, wherein an initial adjustment corrects for a difference between the eyes of the user, and further changes are matched by adjusting for both eyes of the user to maintain continuity of content.

18. The binocular display system of claim 10, further comprising:
    the illumination assembly including a digital correction system, the digital correction system adjusting a display differential comprising one or more of: luminosity, magnification, focal plane, and color to compensate for a condition of the eyes of the user.

19. The binocular display system of claim 18, further comprising:

the digital correction system adjusting the display differential over time to trigger an adjustment in the user's perception, to improve the condition of the eyes.

20. A binocular display system to display an image to a user comprising:

a right eye display element comprising:
- a right eye illumination assembly to provide light; and
- a right eye modulation stack for a right eye of the user comprising a first set of one or more digital light path length modulators to adjust a light path length;
- a right eye image assembly to create a first plurality of image portions at a plurality of focal lengths for the right eye, from the light output by the right eye modulation stack; and a left eye display element comprising:
- a left eye illumination assembly to provide light; and
- a left eye modulation stack for a left eye of the user comprising a first set of one or more digital light path length modulators to adjust a light path length;
- a left eye image assembly to create a second plurality of image portions at a plurality of focal lengths for the left eye, from the light output by the left eye modulation stack; and wherein one of the right eye display element or the left eye display element adjusts a display differential to accommodate a condition of an eye of the user;

wherein the first and second plurality of image portions together provide a correct parallax of images for a three-dimensional effect.

* * * * *